United States Patent
Butsch et al.

(10) Patent No.: US 7,356,856 B2
(45) Date of Patent: *Apr. 15, 2008

(54) TOILET OVERFLOW PREVENTION DEVICE

(75) Inventors: Otto R. Butsch, Placentia, CA (US);
Kevin G. Bowcutt, Aliso Viejo, CA (US); Gregory Blake, Irvine, CA (US);
Daniel L. Corbin, Irvine, CA (US);
Dennis A. Repp, Newport Beach, CA (US)

(73) Assignee: Limit, Inc., Newport Beach, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/016,428

(22) Filed: Dec. 17, 2004

(65) Prior Publication Data

US 2005/0132482 A1    Jun. 23, 2005

Related U.S. Application Data

(63) Continuation-in-part of application No. 10/739,795, filed on Dec. 18, 2003, now Pat. No. 6,961,966.

(51) Int. Cl.
*E03D 11/02* (2006.01)
(52) U.S. Cl. .......................................... 4/427; 137/413
(58) Field of Classification Search .................... 4/328, 4/367, 427, 668; 137/409, 413
See application file for complete search history.

(56) References Cited

U.S. PATENT DOCUMENTS

| | | | |
|---|---|---|---|
| 1,623,586 A * | 4/1927 | Forfar | 137/413 |
| 1,956,087 A | 4/1934 | Tracy | 4/427 X |
| 2,080,073 A | 5/1937 | Finley | 4/427 X |
| 3,075,543 A * | 1/1963 | Holland | 137/413 X |
| 4,170,049 A | 10/1979 | Gilliland | 4/427 |
| 4,348,778 A | 9/1982 | Rau | 4/427 X |
| 4,402,093 A | 9/1983 | Luker et al. | 4/427 |
| 4,498,203 A | 2/1985 | Barnum et al. | 4/427 |
| 4,802,246 A | 2/1989 | Laverty, Jr. | 4/427 |
| 5,062,166 A | 11/1991 | Krenecki | 4/427 |
| 6,052,841 A | 4/2000 | Mankin et al. | 4/427 |
| 6,961,966 B2 * | 11/2005 | Butsch et al. | 4/427 |
| 2003/0196258 A1 | 10/2003 | Pham et al. | 4/427 |

* cited by examiner

Primary Examiner—Robert M. Fetsuga
(74) Attorney, Agent, or Firm—Knobbe, Martens Olson & Bear, LLP

(57) ABSTRACT

A toilet overflow prevention device including an overflow valve assembly, a control valve and a water level sensor. The overflow valve assembly is configured to selectively permit a flow of water through the valve assembly from the tank to the bowl of an associated toilet. The water level sensor is configured to provide a control signal in response to detecting an above-normal water level within the bowl of the toilet. The control valve is configured to actuate the overflow valve assembly in response to a control signal from the water level sensor. Preferably, the overflow valve assembly is separate from the primary flush valve of the toilet and is located between the primary flush valve and the bowl of the toilet.

16 Claims, 18 Drawing Sheets

TOILET OVERFLOW PREVENTION DEVICE

RELATED APPLICATION

This application is a continuation-in-part of U.S. patent application Ser. No. 10/739,795, filed Dec. 18, 2003, now U.S. Pat. No. 6,961,966, the entirety of which is hereby incorporated by reference herein and made a part of this disclosure.

BACKGROUND OF THE INVENTION

1. Field of the Invention

The present invention relates generally to toilet systems and, more particularly, to overflow prevention devices for toilets.

2. Description of the Related Art

Although significant advances have been made in toilet technology, particularly in reducing the amount of water needed for flushing purposes, a satisfactory solution for preventing the overflow of a toilet in the event of a blockage of the toilet bowl, or associated waste plumbing, has not been achieved.

Prior art overflow prevention arrangements have tended to be complex and often require a customized toilet design or significant modification of a standard toilet. For example, as disclosed in U.S. Pat. No. 6,052,841, one prior art solution utilizes a water level sensor and an electric motor to close a valve thereby preventing a flow of water from the toilet tank to the bowl in response to an above-normal water level. Such an arrangement is relatively expensive and requires an external source of power to operate the motor. In addition, such an arrangement may be unreliable, especially if the source of power is expendable, such as batteries, for instance.

Another prior art arrangement, disclosed in U.S. Pat. No. 4,170,049, utilizes a water level sensor in the form of a float to sense an above-normal water level. The float is connected to a stop that is configured to move with the float. The stop moves to a position tending to contact the standard toilet flush valve, or flapper valve, when the float detects an above-normal water level, thereby inhibiting opening of the flush valve. Although such an arrangement eliminates the need for external power, the closure force acting on the flapper valve is limited to the force that is developed by the float. Accordingly, it may be possible for a user to overcome the closure force provided by the stop by forcefully manipulating the toilet handle. In addition, such an arrangement requires a lever assembly to operatively connect the float with the stop member, which results in an undesirably complex device.

SUMMARY OF THE INVENTION

Preferred embodiments of the present invention operate to prevent toilet overflow in a cost-effective and reliable manner. In addition, preferred embodiments may be integrated into a toilet assembly during manufacture or retrofitted into an existing toilet, preferably with little or no modification of the standard toilet. Embodiments intended for retrofitting in existing toilets preferably require a low level of skill to install.

A preferred embodiment of the present invention involves a toilet overflow prevention device comprising an overflow valve assembly having a secondary valve, a fluid cylinder and a transmission mechanism. The secondary valve is positioned between a primary flush valve of the toilet and a bowl of the toilet. The secondary valve is configured to be rotatable from an open position, wherein water is permitted to flow through the secondary valve, to a closed position, wherein water is substantially prevented from flowing from a tank of the toilet to the bowl. The fluid cylinder includes a cylinder member defining a bore and a piston. The piston is configured for translation within the bore and defines a variable volume fluid chamber with the cylinder member. The transmission mechanism is configured to convert translation of the piston into rotation of the secondary valve. The piston is movable from a relaxed position to a displaced position in response to water being introduced into the fluid chamber to move the secondary valve from the open position to the closed position. The device also includes a control valve configured to receive a flow of supply water from a toilet water supply source. The control valve selectively directs a portion of the supply water to the fluid chamber. The control valve is movable between a normal position and an overflow position. In the normal position, substantially no water is directed to the fluid chamber and in the overflow position, supply water is directed to the fluid chamber. The device further includes a water level sensor configured to sense an above-normal water level in the bowl of the toilet. In response to an above-normal water level, the control valve is moved from the normal position to the overflow position, thereby moving the secondary valve from the open position to the closed position and preventing water from flowing from the tank into the bowl.

Another embodiment of the present invention involves a toilet overflow prevention device for use with a toilet having a tank, a bowl, a passage connecting the tank and the bowl, and a flush valve selectively permitting water to move from the tank to the bowl. The device comprises an actuator including an overflow valve having an open position, wherein water is permitted to flow past the valve, and a closed position, wherein water is substantially prevented from flowing past the valve and into the bowl. A water level sensor is configured to sense an above-normal water level in the bowl of the toilet. The water level sensor includes a main flow passage having a first end and a second end. The first end of the main flow passage is configured to receive a flow of water from a water supply source of the toilet and the second end defines a discharge opening. The water level sensor also includes a first branch flow passage having a first end and a second end. The first end communicates with the main flow passage and the second end defines a first inlet opening positioned at the above-normal water level. The water level sensor also includes a second branch flow passage having a first end, a second end and a valve between the first and second ends. The first end communicates with the main flow passage and the second end defines a second inlet opening. When the water level is below the first inlet opening, the valve is moved to a first position and the actuator permits the overflow valve assembly to move to the open position. When the water level is above the first inlet opening, the valve is moved to a second position and the actuator moves the overflow valve from the open position to the closed position, thereby preventing water from flowing from the tank into the bowl.

A preferred embodiment of a toilet overflow prevention device includes an overflow valve assembly positionable between a primary flush valve of a toilet and the bowl of the toilet. The device comprises a water level sensor configured to detect a water level in the toilet bowl and produce a control signal in response to a water level above a predetermined level. The overflow valve assembly is movable, in response to the control signal, from a first position wherein water flow is permitted through said overflow valve to a second position wherein water flow is substantially prevented through said valve. A preferred embodiment of a toilet overflow prevention device is a device as described immediately above, wherein the control signal comprises the presence or absence of a flow of water.

Yet another preferred embodiment of a toilet overflow prevention system includes an overflow valve, a control valve and a water level sensor. The overflow valve is configured to move between an open position in which water flow is permitted between a tank of the toilet and a bowl of the toilet through the overflow valve and a closed position in which the overflow valve substantially prevents water flow from the tank to the bowl. The overflow valve is moveable between the open position and the closed position in response to a control signal. The control valve is configured to selectively send a control signal to the overflow valve. The water level sensor includes a base and a moveable portion that is moveable relative to the base. The water level sensor defines a portion of a fluid passage, preferably an air passage, which communicates with the control valve. The moveable portion moves relative to the base in response to an above-normal water level in the bowl to a position such that the moveable portion cooperates with the base to substantially block flow through the fluid passage and thereby cause the control valve to send a control signal to the overflow valve.

Still another preferred embodiment is a toilet overflow prevention system including an overflow valve configured to substantially prevent water flow from a tank of the toilet to a bowl of the toilet through the overflow valve when the overflow valve is in a closed position. The overflow valve is configured to move to the closed position in response to a supply of water directed to a fluid chamber of the overflow valve. A control valve is configured to selectively direct a supply of water to the overflow valve. The control valve includes a fluid inlet, and first fluid outlet and a valve body. The inlet receives a supply of water from a water supply source of the toilet. The first outlet is configured to direct a portion of the supply of water to the overflow valve. The valve body is moveable between a first position in which fluid communication between the inlet and the first outlet is substantially prevented and a second position in which fluid communication between the inlet and the first outlet is permitted. A variable volume control chamber is configured to act on the valve body, wherein at a first volume of the control chamber, the valve body is in the first position and at a second volume of the control chamber, the valve body is moved to the second position. A water level sensor is configured to sense an above-normal water level in the bowl and communicate with the control chamber. The water level sensor is configured to change a pressure within the control chamber to move the control chamber from the first volume to the second volume.

BRIEF DESCRIPTION OF THE DRAWINGS

These and other features, aspects and advantages of the present invention are described below with reference to preferred embodiments, which are intended to illustrate but not to limit the present invention. The drawings include eighteen figures.

DETAILED DESCRIPTION OF THE PREFERRED EMBODIMENT

Figure 1:
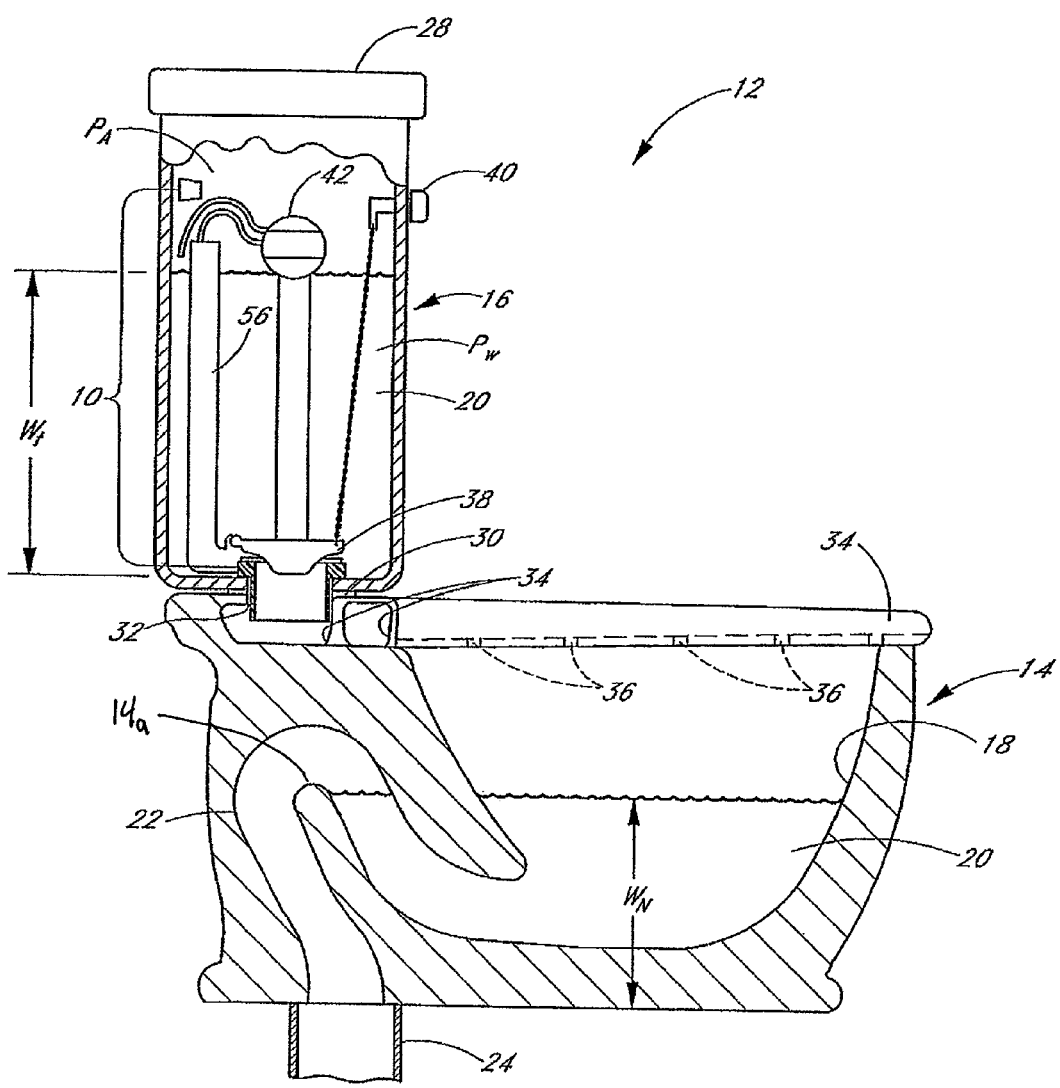
FIG. 1 is a side, partial cross-sectional view of a toilet incorporating an overflow prevention device including certain features, aspects and advantages of the present invention. The toilet generally includes a base, defining a bowl, and a tank supported on the base. An interior of the tank communicates with the bowl through a passage.

FIG. 1 illustrates a preferred embodiment of the toilet overflow prevention device 10 incorporated within a toilet 12. The toilet 12 preferably is of a conventional configuration and includes a base 14 and a tank 16 supported on the base 14. Although the overflow prevention device 10 is described herein in the context of such a toilet 12 having a base 14 and a tank 16, the device 10 may be adapted for use with toilets having alternative configurations, as will be appreciated by one of skill in the art in view of the present disclosure.

The base 14 defines a bowl 18, which is configured to hold a volume of water 20. A siphon tube 22 connects the bowl 18 with a wastewater plumbing system 24. The siphon tube 22 extends in an upward direction from a lower portion of the bowl 18 and then curves into a downward direction toward the lower end of the base 14 to meet the wastewater plumbing system 24. Accordingly, the height of the upper curve 14a determines a normal water level $W_N$ within the bowl 18.

Preferably, the tank 16 is of a hollow construction and defines an interior space configured to hold a volume of water 20. The volume of water 20 in the tank 16 preferably defines a normal water level $W_T$. Thus, the interior of the tank 16 is the divided into a water portion $P_W$ and an air portion $P_A$. Preferably, an open upper end of the tank 16 is covered by a lid 28.

Water 20 is evacuated from the tank 16 through an outlet 30 defined by a lower wall of the tank 16. Water 20 passing through the outlet 30 moves to the bowl 18 through a passage 32 and gallery 34. The passage 32 extends generally vertically from the tank outlet 30 to the gallery 34. The gallery 34 is oriented in a horizontal plane and, preferably, substantially surrounds the bowl 18 at its upper edge, or rim. Openings 36 permit water 20 to flow from the gallery 34 into the bowl 18.

Figure 2:
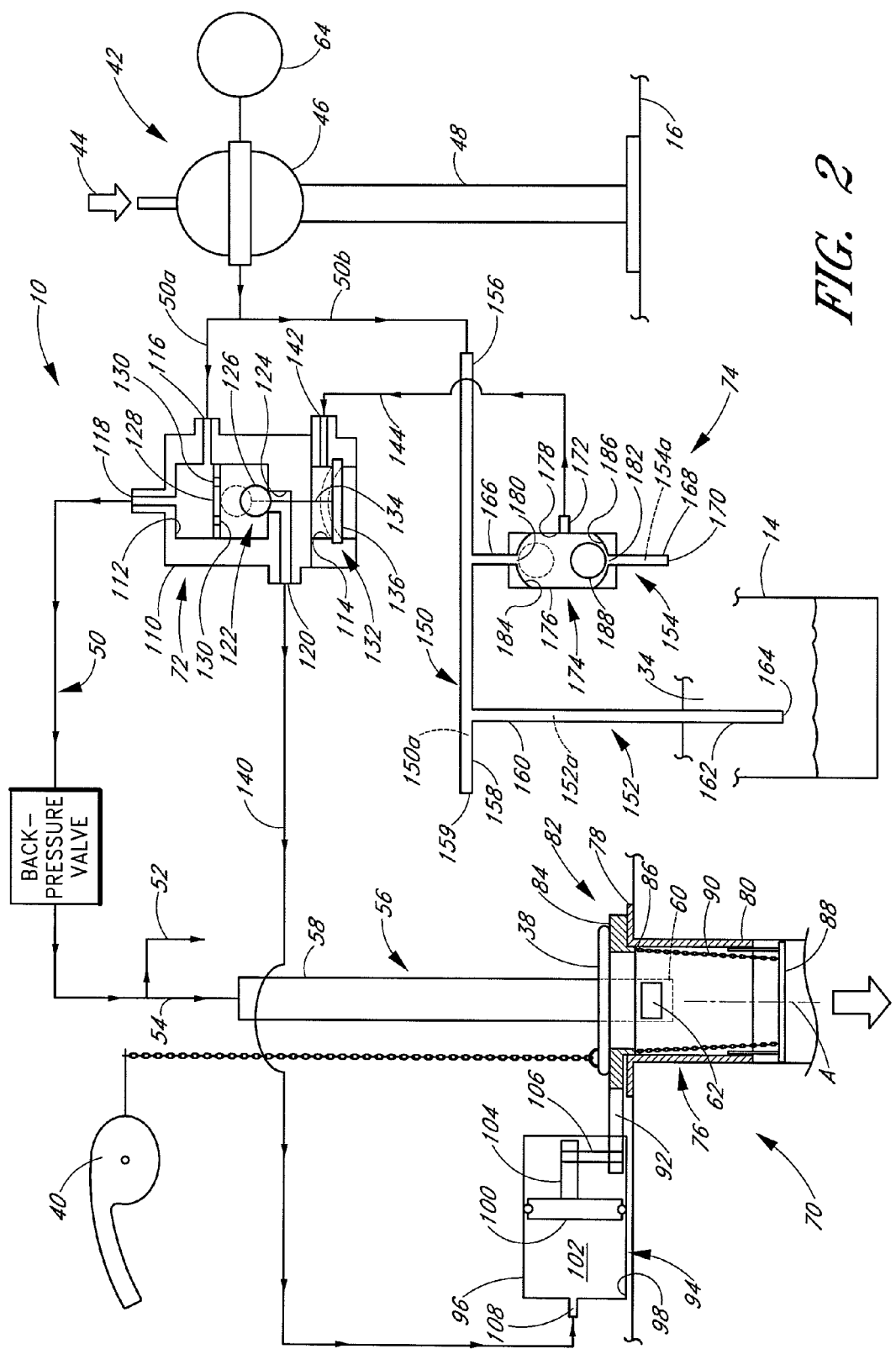
FIG. 2 is a schematic illustration of the toilet and the overflow prevention device of FIG. 1. The illustrated overflow prevention device generally includes an overflow valve assembly, a control valve and a water level sensor.

With additional reference to FIG. 2, the toilet 12 includes a primary flush valve, or flapper valve 38. The illustrated flapper valve 38 pivots between a closed position, wherein water 20 within the tank 16 is substantially prevented from flowing through the tank outlet 30, to an open position, wherein the water 20 within the tank 16 is permitted to flow through the tank outlet 30 and into the bowl 18 through the passage 32 and the openings 36 of the gallery 34. The flapper valve 38 is controlled by a handle 40 external to the tank 16, which permits a user to activate flushing of the toilet 12.

The toilet 12 also includes a tank fill mechanism 42 configured to refill the tank 16 with water 20 from an external water supply source 44 after the tank 16 has been emptied, or the volume of water 20 reduced, during a flush cycle. The tank fill mechanism 42 includes a filler valve 46, which is typically supported at a height above the lower end of the tank 16 by a support structure 48. The filler valve 46 is configured to selectively permit water 20 from the water supply 44 to fill the tank 16 and, typically, the bowl 18.

The filler valve 46 supplies water 20 to the tank 16 and the bowl 18 through a supply line 50. Preferably, the supply line 50 includes a first branch, or tank supply branch 52 and a second branch, or bowl supply branch 54. The tank supply branch 52 supplies water 20 directly into the interior of the tank 16. Optionally, a back-pressure valve may be provided in the supply line 50 to create a desired pressure upstream of the back-pressure valve. Thus, the back-pressure valve may be utilized to alter the supply pressure of the water supply source 44. However, it is contemplated that in most applications, the back-pressure valve will be omitted.

The bowl supply branch 54 supplies water 20 to the bowl 18 through an overflow tube 56. The overflow tube 56 includes an open upper end 58 and a lower end 60, which defines a discharge opening 62. The bowl supply branch 54 supplies water 20 to an internal passage of the overflow tube 56 through the upper end 58 and water is discharged through the discharge opening 62.

Preferably, the upper end 58 of the overflow tube 56 is positioned above a normal water level $W_T$ within the tank 16. The discharge opening 62 preferably is positioned below the flapper valve 38 to permit water 20 within the tank to move into the bowl 18 through the overflow tube 56 when the flapper valve 38 is in a closed position. Thus, the overflow tube 56 permits water 20 above a normal water level $W_T$ to bypass the flapper valve 38 in the event that the water level within the tank 16 rises above the upper end 58 of the overflow tube 56. For example, in the event of a malfunction of the filler valve 46. The overflow tube 56 also permits the filler valve 46 to supply water 20 to the bowl 18 through the discharge opening 62 when the flapper valve 38 is in a closed position.

The filler valve 46, in the illustrated arrangement, is controlled by a tank water level sensor in the form of a float 64. Thus, the float 64 preferably defines the normal water level $W_T$ within the tank 16 by moving the filler valve 46 to a closed position upon reaching a desired water level $W_T$.

The illustrated embodiment of the overflow prevention device 10 generally includes an overflow valve assembly 70, a control valve 72 and a water level sensor 74. The overflow valve assembly 70 is configured to selectively permit, or prevent, water 20 from flowing from the tank 16 to the bowl 18 regardless of the position of the flapper valve 38. Preferably, the overflow valve assembly 70 is positioned between the flapper valve 38 and the bowl 18 and, more preferably, is positioned generally within the passage 32 between the tank 16 and the gallery 34.

The control valve 72 preferably functions as an actuator to move the overflow valve assembly 70 between an open position and a closed position. In the illustrated arrangement, the control valve 72 is configured to receive a control signal from the water level sensor 74 and to send a control signal to the overflow valve assembly 70 to move the overflow valve assembly 70 between an open and closed position.

The water level sensor 74 is configured to sense an above-normal water level within the bowl 18 and send a signal to the control valve 72 in response to such a condition. An above-normal water level within the bowl 18 may be defined as any water level above the normal water level $W_N$. Desirably, the above-normal water level is predetermined during the design and/or setup of the device 10. Although the water level sensor 74 is configured to determine an above-normal water level within the bowl 18, preferably, the sensor 74 determines a level of water within the gallery 34 or passage 32 presuming such a level is below an upper end of the bowl 18. However, in alternative arrangements, the sensor 74 may determine an above-normal water level from within the bowl 18, or an alternative location that has a water level indicative of the water level within the bowl 18.

The overflow valve assembly 70 preferably includes a base 76, which passes through the outlet 30 of the tank 16 and into the passage 32. The illustrated base 76 includes an upper portion 78 and a lower portion 80. The upper portion 78 resides within the tank 16 and supports the base 76 on the flapper valve assembly 38 or, alternatively, on an interior surface of the tank 16. The lower portion 80 is a hollow, cylindrical member, which extends downwardly from the upper portion 78 through the outlet 30 and into the passage 32.

The overflow valve assembly 70 also includes a cup 82 supported by the base 76. Preferably, the cup 82 includes an upper flange 84, which rests on the base 76, and an annular portion 86, which extends downwardly into the interior space of the lower portion 80 of the base 76. Preferably, the annular portion 86 of the cup 82 fits relatively snugly within the lower portion 80 of the base 76 while permitting the cup 82 to rotate with respect to the base 76.

A valve gate, or a stopper 88, is connected to the cup 82 through one or more couplers 90. The stopper 88 is configured to substantially entirely close off the lower end 80 of the base 76 to substantially prevent water from passing through the overflow valve assembly 70. A complete seal between the stopper 88 and the base 76 is preferred, however, it is to be understood that some amount of water may be permitted to move past the stopper 88 in its closed position. For example, an incomplete seal between the stopper 88 and base 76 may result due to normal manufacturing variations.

The stopper 88 is "keyed" to the base 76 to prevent rotation of the stopper 88 about an axis A of the passage 32 relative to the base 76. Accordingly, when the cup 82 is rotated relative to the base 76 (and the stopper 88) the effective length of the couplers 90 is shortened to draw the stopper 88 toward the lower end 80 of the base 76 to the closed position of the stopper 88. That is, the couplers 90 move from a position substantially parallel to the axis A to a position wherein an axis of each coupler 90 forms an angle with the axis A.

In the illustrated arrangement, two couplers 90 are provided in the form of chain members, preferably similar in construction to the chain often used to connect the flapper valve 38 to the handle 40. However, other suitable couplers 90 may also be used that preferably are substantially fixed in length and capable of withstanding a load imparted onto the couplers 90 due to the weight of the water 20 within the tank 16. In addition, varying numbers of couplers 90 may be used, including a single coupler 90. Other suitable arrangements for converting rotational motion of the cup 82 into linear movement of the stopper 88 may also be employed.

An actuating arm 92 extends generally outward from the flange 84 of the cup 82 in a radial direction. The arm 92 is coupled to an output of an actuator, or fluid cylinder 94, which is configured to apply a force to the actuating arm 92 to rotate the cup 82 relative to the base 76. The fluid cylinder 94 includes a housing, or case 96, that defines an internal, preferably cylindrical bore 98. However, the bore 98 may be of other shapes as well. A piston 100 is configured for reciprocation within the bore 98. Together, the piston 100 and the case 96 define a variable volume fluid chamber 102. Thus, as used herein, "fluid cylinder" desirably refers to an assembly comprising a piston member movable relative to a chamber-defining member, or other equivalent structures, and is not necessarily limited to cylindrical structures.

A piston rod 104 is coupled to the piston 100 and extends from the piston 100 in a direction opposite the fluid chamber 102. The piston rod 104 is coupled to the actuating arm 92 of the cup 82 through a suitable connector, such as a shaft 106. Preferably, the shaft 106 is configured to rotate with respect to one or both of the piston rod 104 and the actuating arm 92. Thus, the piston rod 104, shaft 106 and actuating arm 92 operate as a transmission mechanism to convert linear motion of the piston 100 into rotational motion of the cup 82. In addition, other suitable motion conversion and/or transmission mechanisms may also be used.

The case 96 also includes a port 108 to permit fluid to move into or out of the fluid chamber 102. Preferably, the port 108 is defined by an end of the case 96 opposite the piston rod 104.

As described above, the control valve 72 is configured to receive a control signal from the water level sensor 74 and to actuate the overflow valve assembly 70 in response to the control signal. In the illustrated embodiment, the control valve includes a housing 110, which defines a first or upper fluid chamber 112 and a second, or lower fluid chamber 114. Desirably, the upper chamber 112 and lower chamber 114 are separated from one another. The control valve 72 includes an inlet 116 and a pair of outlets 118, 120 that communicate with the upper chamber 112.

Figure 8:
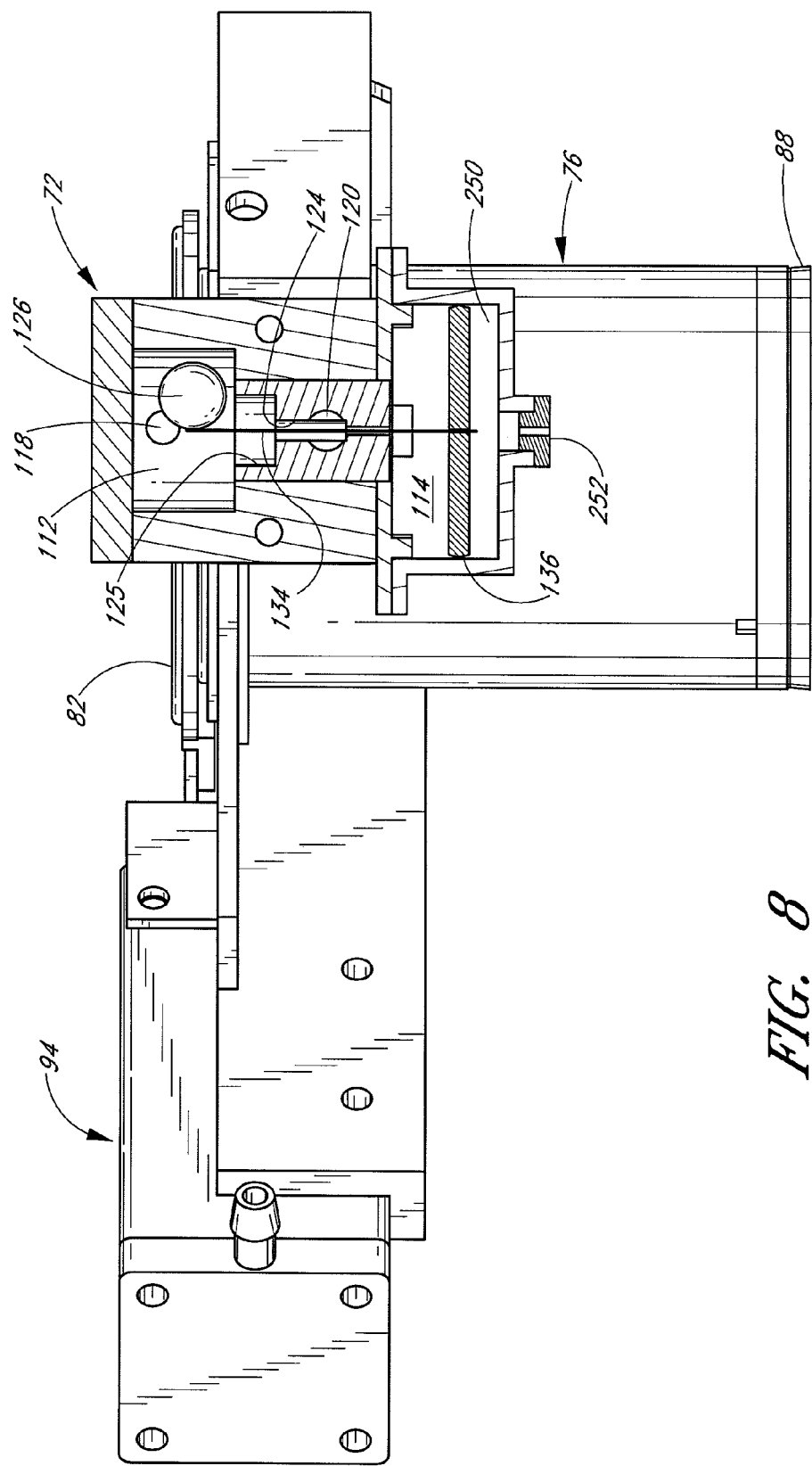
FIG. 8 is a partial cross-sectional view of the control valve shown in FIG. 3, taken along view line 8-8 of FIG. 5.

Preferably, a valve 122 selectively permits fluid communication between the upper chamber 112 and the outlet 120. In the illustrated embodiment, the outlet 120 defines an opening 124 that opens into the upper chamber 112 and is surrounded by a valve seat 125 (FIG. 8). A ball member 126 is sized and shaped to cooperate with the valve seat 125 of the opening 124 to selectively block the opening 124 and substantially prevent fluid flow from the upper chamber 112 through the outlet 120. When the ball member 126 is removed from the valve seat of the opening 124 fluid flow is permitted from the upper chamber 112 to the outlet 120.

Desirably, a baffle plate 128 is positioned between the inlet 116 and the ball member 126. Preferably, the baffle plate 128 is a disk-like member that contacts an outer wall of the upper chamber 112 along its entire periphery. The baffle plate 128 includes one or more openings 130, which permit fluid to flow from the inlet, through the baffle plate 128, toward the ball member 126. However, the baffle plate 128 desirably inhibits the flow of incoming water from disturbing the position of the ball member 126 relative to the valve seat 125 of the opening 124. Alternatively, other suitable baffle arrangements may be used, if necessary or desired.

The ball member 126 is moved between an open and closed position by a valve actuation mechanism 132. In the illustrated embodiment, the valve actuation mechanism 132 includes a push rod 134 moveable by a diaphragm 136. Preferably, the diaphragm 136, in a relaxed position, positions the push rod 134 such that an upper end of the push rod 134 moves the ball member 126 off of the valve seat 125 of the opening 124 to an open position wherein fluid is permitted to flow from the upper chamber 112 to the outlet 120.

The diaphragm 136 is responsive to water pressure within the lower chamber 114 to move to a second position wherein the push rod 134 is lowered to permit the ball member 126 to engage the valve seat of the opening 124 and substantially prevent water flow from the upper chamber 112 to the outlet 120. The ball member 126 preferably is urged into engagement with the valve seat 125 by water pressure within the upper chamber 112. However, the ball member 126 may also be biased into engagement with the valve seat 125 by a suitable biasing arrangement, such as a spring, for example.

In the illustrated arrangement, the control valve 72 receives a supply of water from the external water supply 44. The supply of water is delivered into the upper chamber 112 through the inlet 116 by a first branch 50a of the supply line 50. Preferably, water received from the inlet 116 is permitted to pass substantially uninterrupted from the upper chamber 112 through the outlet 118 to the tank supply branch 52 and bowl supply branch 54, as described above.

In addition, water within the upper chamber 112 is permitted to flow through the outlet 120 when the valve 122 is in an open position (e.g., the ball member 125 is disengaged from the valve seat 125). Water exiting the outlet 120 flows through a supply line 140 to the fluid chamber 102 of the fluid cylinder 94 to actuate the piston 100, preferably as described above.

The lower chamber 114 includes an inlet 142, which permits water to flow from a control line 144 into the lower chamber 114. Desirably, water flow within the control line 144 is selectively provided by the water level sensor 74. Thus, in the illustrated embodiment, the control signal from the water level sensor 74 comprises the presence or absence of a flow of water through the control line 144 and into the lower chamber 114 to influence a position of the diaphragm 136, as described above.

The water level sensor 74 is configured to detect an above-normal water level within the bowl 18 of the toilet 12 and, in response, send a control signal to the control valve 72. In the illustrated embodiment, the water level sensor 74 includes a main water line 150 defining a passage 150a, a first branch line 152 defining a passage 152a and a second branch line 154 defining a passage 154a. The passages 150a, 152a, 154a communicate with one another.

The main line 150 includes a first end, or inlet end 156 and a second end, or discharge end 158. The main line 150 receives a supply of water from the external water supply 44 through the inlet 156 from a second branch 50b of the supply line 50.

The first branch line 152 is coupled to the main line 150 at a first end 160. The first branch line 152 also includes a second end 162 defining an opening 164 communicating with the first branch passage 152a. The opening 164 operates as a water level sensing mechanism, as is described in greater detail below.

The second branch line 154 includes a first end 166 coupled to the main line 150, preferably at a position upstream from the first branch line 152. The second branch line 154 also includes a second end 168, which defines an opening 170 communicating with the second branch passage 154a. The second branch line 154 also includes an outlet 172, which supplies a flow of water to the control line 144 coupled to the inlet 142 of the lower chamber 114 of the control valve 72.

A valve 174 is positioned within the second branch line 154 between the first end 166 and the second end 168. The valve 174 has a first position wherein water is permitted to flow from the first end 166 through the outlet 172. Preferably, in the first position of the valve 174, water is substantially prevented from flowing through the second end 168 of the second branch passage 154a. In a second position of the valve 174, water is substantially prevented from flowing from the first end 166 of the second branch passage 154a through the outlet 172 and into the control line 144.

In the illustrated arrangement, the valve 174 includes a housing 176 defining an interior chamber 178. The first end 166 of the second branch passage 154a communicates with the chamber 178 through a first opening 180. Similarly, the second end 168 of the second branch passage 154a communicates with the chamber 178 through a second opening 182. A first valve seat 184 surrounds the first opening 180 and is preferably hemispherical in shape with a concave surface facing the chamber 178. A second valve seat 186 surrounds the second opening 182 and is also hemispherical in shape and also with a concave surface facing the chamber 178.

A ball member 188 is positioned within the chamber 178 and is moveable between a position engaged with the first valve seat 184 and a position engaged with the second valve seat 186 to selectively prevent fluid flow through the first opening 180 and the second opening 182, respectively. When the ball member 188 is engaged with the second valve seat 186 fluid flows permitted from the first end 166 of the second branch passage 154a through the chamber 178 and out the outlet 172 to the control line 144. Conversely, when the ball member 188 is engaged with the first valve seat 184 fluid flow from the first end 166 of the second branch passage 154a is not permitted into the chamber 178 and, thus, no fluid flow is permitted through the control line 144. Although, the above-described valve assembly is preferred, other suitable valve arrangements may also be used within the water level sensor 74. Indeed, other suitable water level sensors may be alternatively used in connection with the device 10.

Desirably, the outlets 159, 170 of the main line 150 and the second branch line 154, respectively, are positioned within an air space. Preferably, the outlets 159, 170 are positioned within the airspace $P_A$ of the tank 16. Desirably, the first branch line 152 extends from the main line 150 through the water 20 within the tank 16 and through the overflow valve assembly 70 into the gallery 34 of the base 14. However, the second end 162 may also be positioned within the bowl 18, as will be appreciated by one of skill in the art. Desirably, the opening 164 of the second end 162 of the first branch line 152 is positioned above a normal water level $W_N$ within the bowl 18. The opening 164 preferably is positioned at a desired above-normal water level.

When the filler valve 46 is in a position permitting water to flow from the water supply 44 to the supply line 50, the main passage 150a receives a flow of water from the supply line branch 50b at its inlet end 156. Water flows from the inlet end 156 through the main passage 150a and exits from the discharge end 158. Upon passing the junction between the main passage 150a and the first branch passage 152a, the water flow within the main passage 150a mixes with air drawn into the water stream from the first branch passage 152a when the opening 164 is not immersed in water 20 (e.g., the water 20 in the bowl 18 is below the above-normal water level).

Thus, downstream from the junction between the main passage 150a and a first branch passage 152a, a mixture of water and air flows through the main passage 150a when the opening 164 is not immersed in water 20. The mixture of both water 20 and air downstream of the first branch passage 152a subjects the water 20, alone, upstream of the first branch passage 152a to a relative high-pressure condition. As a result, water flows into the first end 166 of the second branch passage 154a and moves the ball member 188 away from the first valve seat 184 and, preferably, into engagement with the second valve seat 186. Water is then permitted to flow through the outlet 172 and into the control line 144, thereby biasing the control valve 72 into a closed position wherein water 20 is not permitted to flow through the outlet 120 and to the fluid cylinder 94.

If the water 20 within the bowl 18 (or gallery 34) rises to a sufficient level to cover the opening 164 of the first branch line 152 (i.e., an above-normal water level), no air is drawn into the first branch passage 152a in response to water flow past the first branch passage 152a. As a result, air is drawn through the opening 170 of the second branch passage 154a, in response to water 20 within the main passage 150a flowing past the second branch passage 154a and moves the ball member 188 away from the second valve seat 186. Preferably, the ball member 188 is moved into engagement with the first valve seat 184 thereby substantially preventing water from flowing from the first end 166 of the second branch line 154 through the chamber 178 and outlet 172 and into the control line 144. Accordingly, no water 20 is provided to the lower chamber 114 and the control valve 72 moves to an open position wherein water is supplied to the fluid cylinder 94.

In operation, the overflow prevention device 10 utilizes the water level sensor 74 to indirectly detect an above-normal water level within the bowl 18 and, in response, send a control signal to the control valve 72. The control valve 72 in response to the control signal actuates the overflow valve assembly to move the stopper 88 to a closed position thereby preventing water 20 within the tank 16 from moving from the tank 16 to the bowl 18. Accordingly, overflowing of the toilet bowl 18 is prevented.

Specifically, when a user actuates the handle 40 to flush the toilet 12, the flapper valve 38 is opened to permit water 20 within the tank 16 to flow past the flapper valve 38. If an above-normal water level does not exist as determined by the water level sensor 74, a flow of water is delivered to the lower chamber 114 of the control valve 72. As a result, the control valve 72 does not actuate the overflow valve assembly 70 and the stopper 88 remains in an open position. Accordingly, water 20 within the tank 16 is permitted to flow past the flapper valve 38 and through the overflow valve assembly 70 to the bowl 18 passing through the passage 32 and the gallery 34.

In response to the water 20 vacating the tank 16, the float 64 moves to a lowered position to open the filler valve 46 and permit a flow of water to flow from the water supply 44 into the supply line 50. The water within the supply line 50 branches into the first branch 50a moves through the upper chamber 112 of the control valve 72 and through the bowl supply branch 54 and tank supply branch 52 to fill the bowl 18 and the tank 16, respectively. Water flowing through the second branch 50b of the supply line 50 flows through the main passage 150a of the water level sensor 74 and discharges from the discharge end 158, along with air drawn from the first branch passage 152a. Preferably, as described above, the discharge end 158 of the main line 150 is positioned within the air space $P_A$ of the tank 16 and the discharged water from the main line 150 also fills the tank 16. Once the water level within the tank 16 has reached a normal level $W_T$, the float 64 operates to shut off the filler valve 46, which prevents a flow of water from the water supply 44 into the supply line 50.

In contrast, in the event of an above-normal water level reading by the water level sensor 74 when the toilet is flushed, no water is sent to the control valve 72 from the water level sensor 74 and, therefore, a control valve 72 actuates the flow valve assembly 70 to close the stopper 88. Therefore, water flow from the tank 16 to the bowl 18 is prevented. Desirably, the stopper 88 remains in a closed position at least until the tank 16 is filled to the normal tank level $W_T$, whereupon the float 64 shuts off the filler valve 42. Once the above-normal water level condition is removed, water pressure from water within the tank 16 acting on the stopper 88 may move the stopper 88 to an open position when the flapper valve 38 is opened to once again permit water to move from the tank 16 to the bowl 18 in a normal manner. Movement of the stopper 88 also moves the piston 100 to its relaxed position. Alternatively, the piston 100 may be biased to its relaxed position to move the stopper 88 to an open position in the absence of an above-normal water level by a suitable biasing arrangement, such as a spring, for example.

Figure 3:
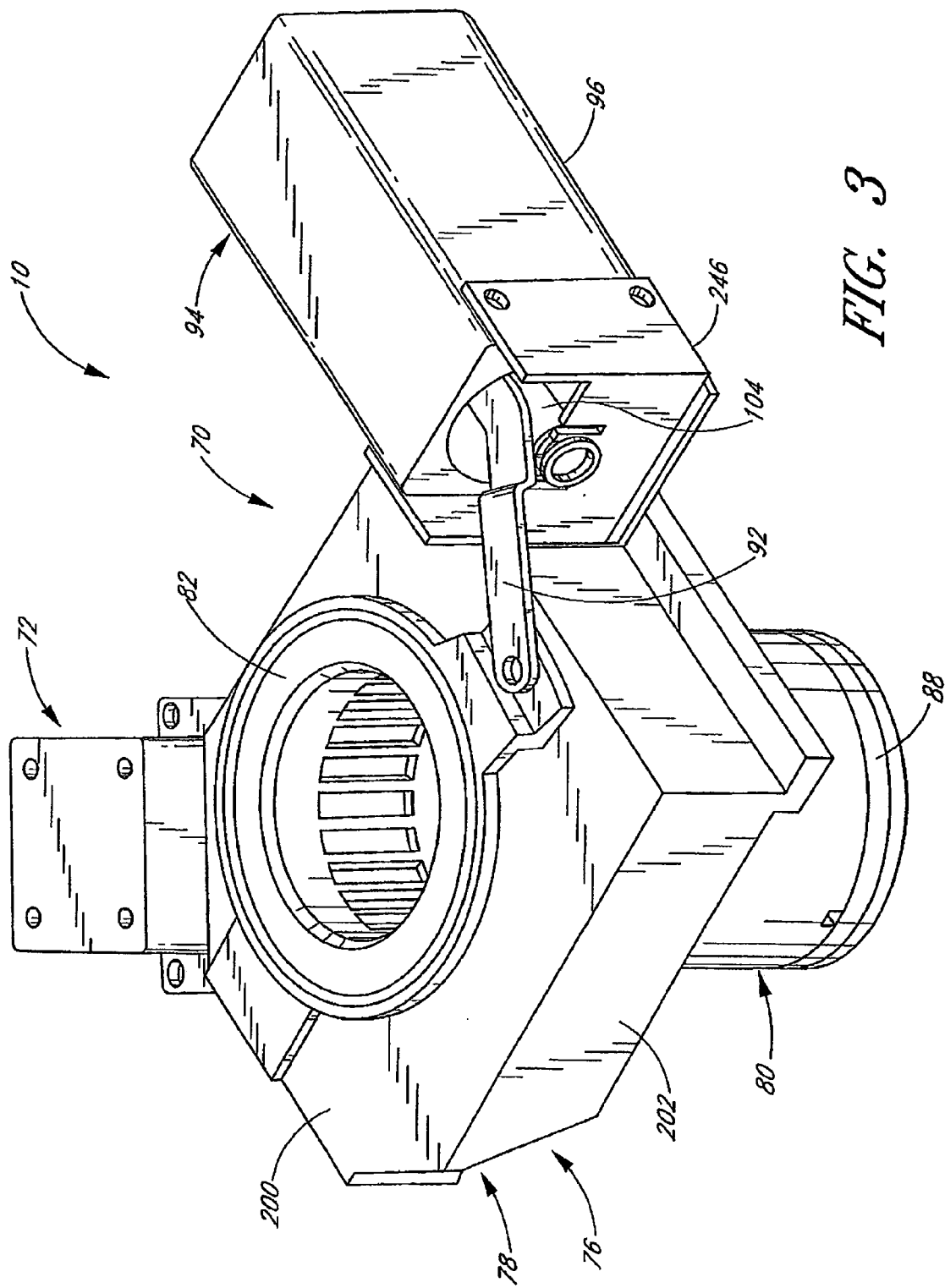
FIG. 3 is a perspective view of the overflow valve assembly and control valve of the overflow prevention device of FIG. 1.

FIGS. 3-8 illustrates a specific construction of a presently preferred overflow valve assembly 70 and control valve 72, which operate as described above with reference to FIGS. 1 and 2. Preferably, the base 76 includes an upper portion 78 and a lower portion 80, as noted above. With reference to FIG. 3, preferably, the upper portion 78 includes a planar, upper wall 200 and a side wall 202 that extends downwardly from a periphery of the upper wall 200 on at least three sides of the upper wall 200. The lower portion 80 comprises a hollow, cylindrical member 204 that is unitary with the upper wall 200. Alternatively, the cylindrical 204 may be a separate piece connected to the upper wall 200. The hollow, inner bore of the cylindrical member 204 defines a passageway 206.

Figure 4:
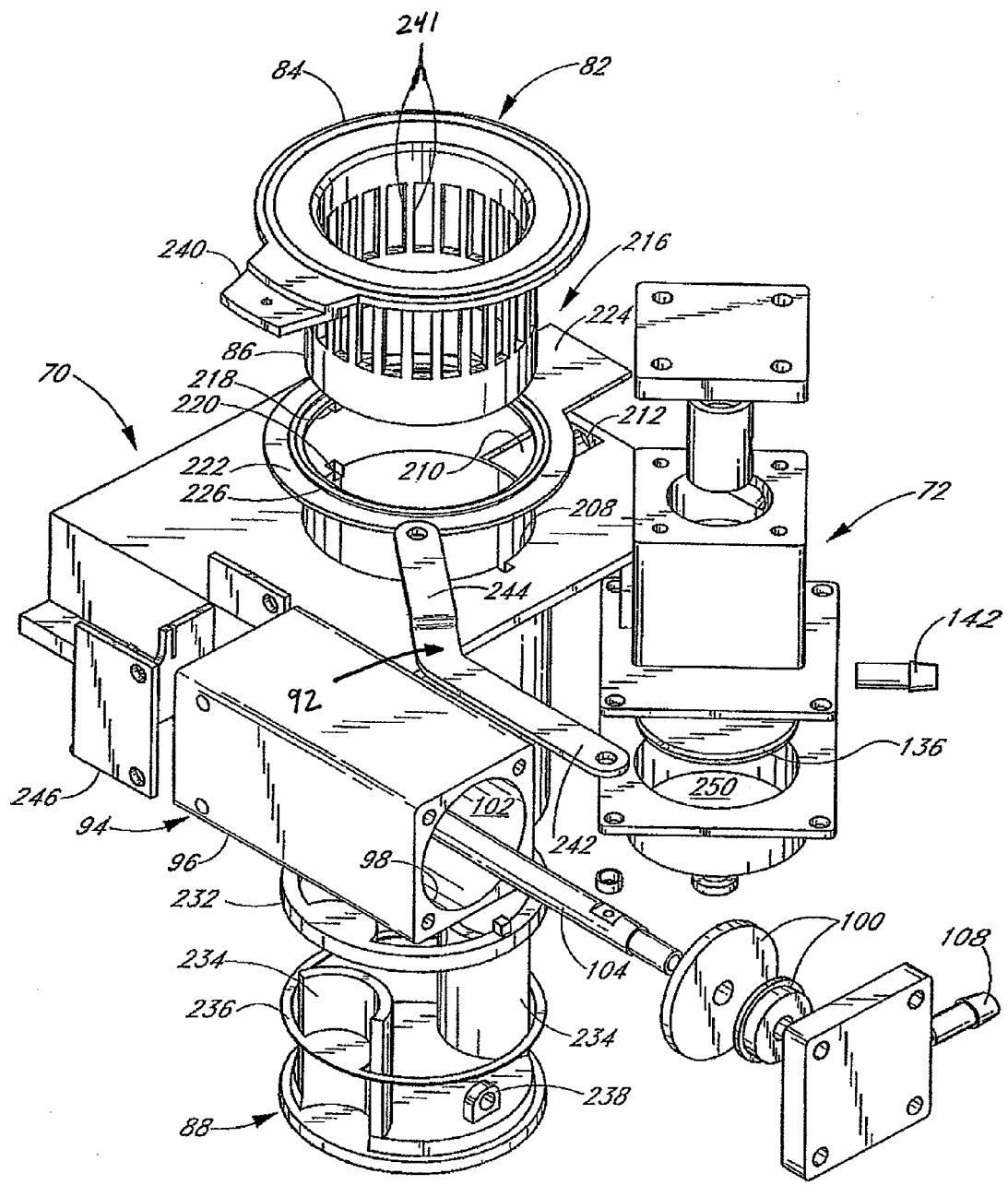
FIG. 4 is an exploded view of the overflow valve assembly and control valve shown in FIG. 3.
Figure 5:
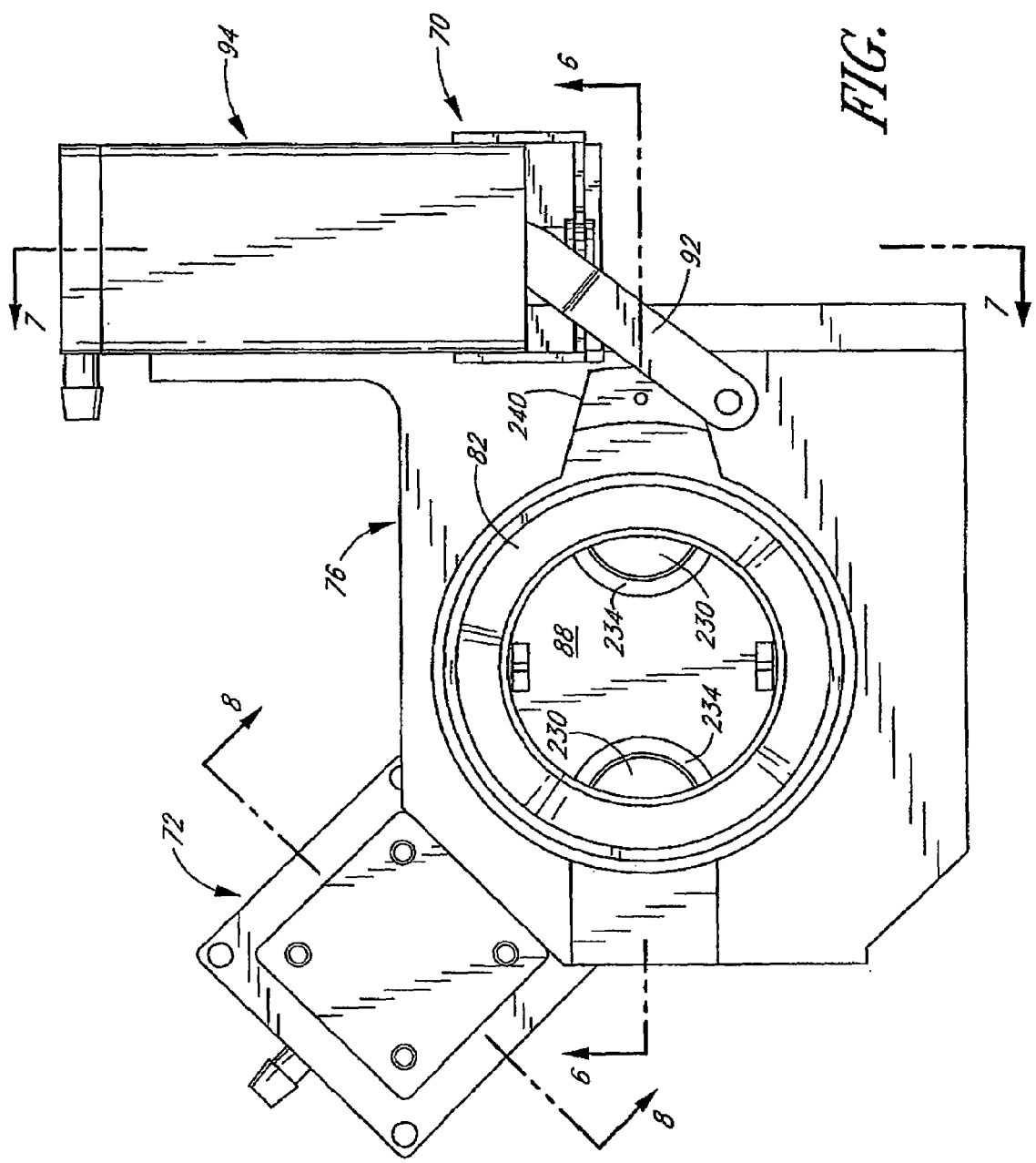
FIG. 5 is a top, plan view of the overflow valve assembly and control valve shown in FIG. 3.
Figure 6:
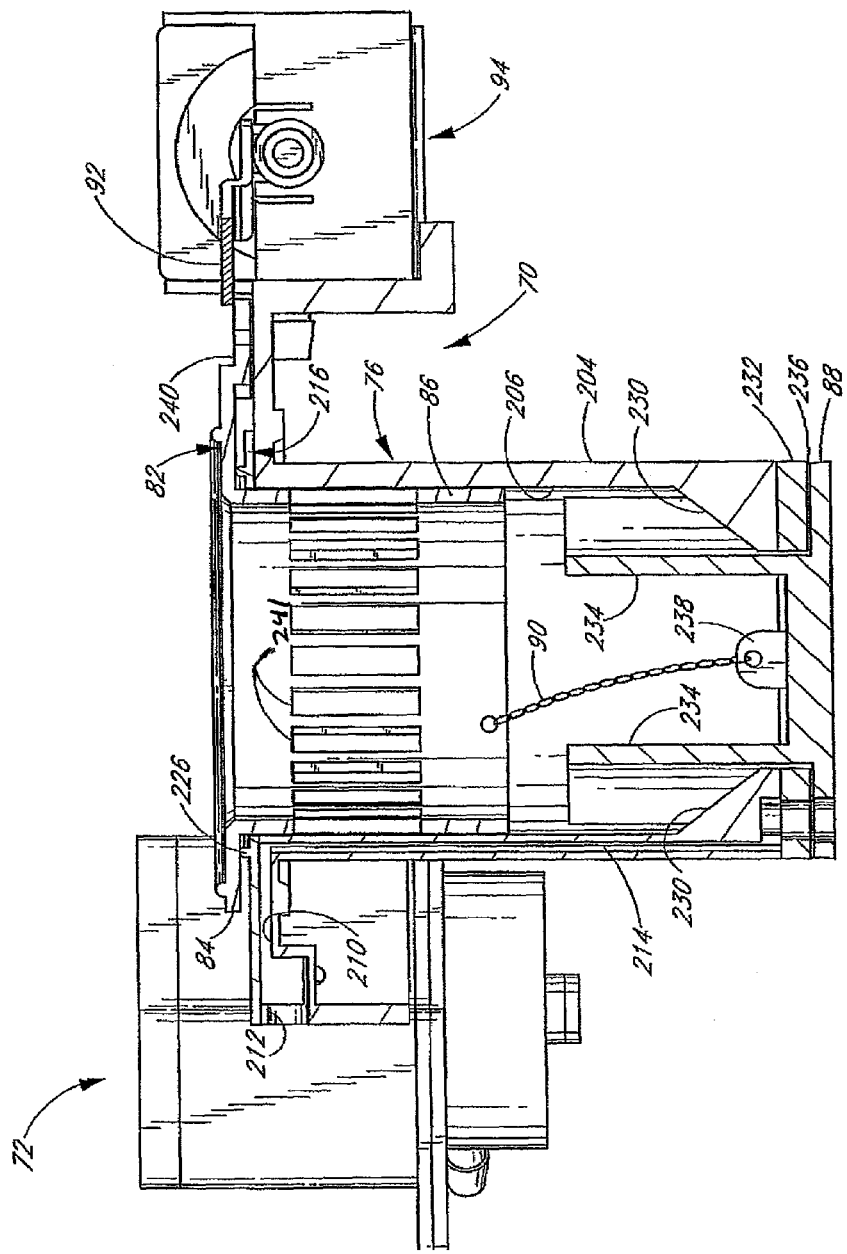
FIG. 6 is a partial cross-sectional view of the overflow valve assembly and control valve shown in FIG. 3, taken along the view line 6-6 of FIG. 5.
Figure 7:
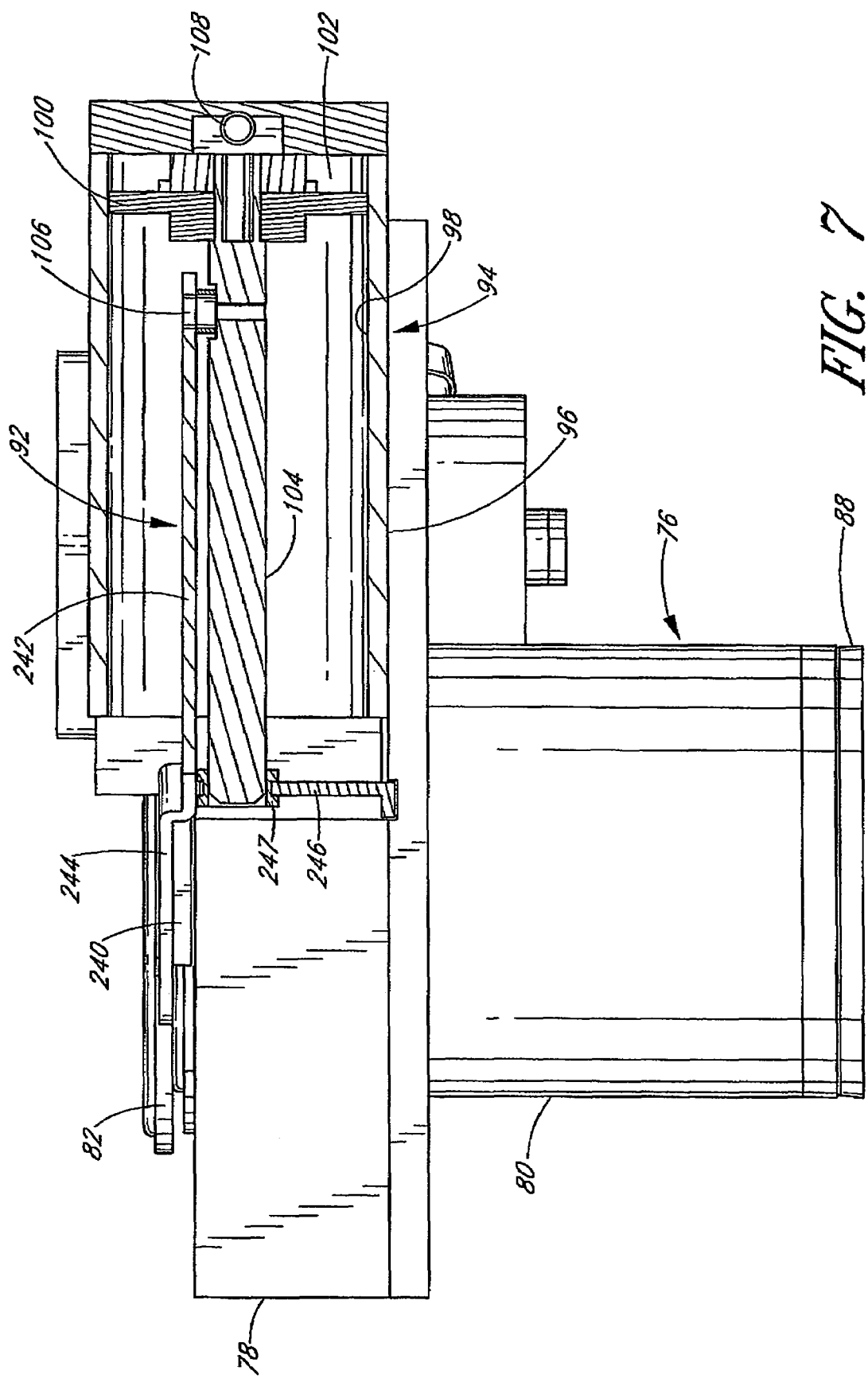
FIG. 7 is a partial cross-sectional view of a fluid cylinder assembly of the control valve shown in FIG. 3, taken along the view line 7-7 of FIG. 5.

With reference to FIG. 4, the upper wall 200 includes a circular opening 208 which permits communication with the passageway 206 of the cylindrical member 204. A side channel 210 extends toward the opening 208 in a radial direction. An inlet port 212 is defined within the side wall 202 to permit fluid communication with the side channel 210. A secondary passageway 214 (FIG. 6) extends alongside the passageway 206 and communicates with the side channel 210 at is upper end. The side channel 210 and secondary passageway 214 permit a flow of water through the overflow tube 56 and discharge opening 62 to bypass the overflow valve assembly 70 and refill the bowl 18 when the overflow valve assembly 70 is in the open position. Alternatively, other suitable arrangements may be used to permit water to bypass the overflow valve assembly 70 to fill the bowl 18 when the overflow valve assembly 70 is in the open position.

Preferably, a cover 216 is connected to the upper wall 200 by a pair of tabs 218 (only one shown) received within slots 220 defined by the upper wall 200. The cover 216 includes an annular portion 222 and a projecting portion 224. The annular portion 222 is sized to surround the opening 208 of the upper portion 78 of the base 76. The projecting portion 224 extends generally radially away from the annular portion 222 and is sized and shaped to cover the side channel 210 of the upper portion 78.

Preferably, an upper surface of the annular portion 222 of the cover 216 defines a raised bearing surface 226. Preferably, the bearing surface 226 is annular in shape and also surrounds the opening 208. The bearing surface 226 preferably is semi-circular in section to define a low friction surface for the cup 82 to rotate upon. Although an annular bearing surface 226 is shown, alternative arrangements are possible where the bearing surface 226 does not completely encircle the opening 208. For example, the bearing surface 226 may be interrupted along the periphery of the opening 208 or may comprise one or more distinct, raised surfaces configured to support the cup 82.

To "key" the stopper 88 with respect to the base 76, an internal surface of the cylindrical member 204 defines an opposed pair of semi-circular projections 230, which extend inwardly into the passageway 206. Preferably, a ring 232 is shaped similarly to a lower-end surface of the cylindrical member 204 and is coupled thereto. The projections 230 cooperate with elongated, semi-cylindrical guides 234, which extend in an upward direction from an upper surface of the stopper 88. As described above, the guides 234 and projections 230 prevent the stopper 88 from rotating relative to the cylindrical member 204 of the base 76 when the cup 82 rotates. Thus, rotation of the cup 82 results in linear movement of the stopper 88 through one or more couplers therebetween, such as the chain 90.

Desirably, a seal 236 is positioned between the stopper 88 and a lower surface of the ring 232 to provide a seal therebetween when the stopper 88 is in a closed position. A pair of tabs 238 are provided to permit the chain 90 to be connected between the stopper 88 and the cup 82.

Preferably, the cup 82 is a hollow, cylindrical member as described above, including the flange 84 and the base 86. An extension 240 projects radially from the flange 84 and is configured for connection to the actuating arm 92 of the fluid cylinder 94. In addition, preferably, the base 86 of the cup 82 includes a plurality of openings, or slots 241 extending around a periphery of the base 86.

As described above, preferably, the fluid cylinder arrangement 94 includes a piston 100 connected to a piston rod 104. The actuating arm 92 is connected to the piston rod 104 to translate linear motion of the piston rod 104 into rotational motion of the cup 82. With reference to FIG. 4, preferably the actuating arm 92 includes a first arm portion 242 and a second arm portion 244 that define an angle therebetween. Preferably, the angle is approximately 120°.

In the illustrated arrangement, the case 96 of the fluid cylinder arrangement 94 is generally rectangular in cross-sectional shape and defines the cylindrical fluid chamber 102. Preferably, a piston rod support 246 is coupled to an end of the case 96 to support an end of the piston rod 104 opposite the piston 100 and includes a bushing 247 (FIG. 7) to facilitate sliding movement of the piston rod 104.

With reference to FIG. 8, a preferred control valve 72 is illustrated. As described above, the control valve 72 includes an upper chamber 112 and a lower chamber 114. A diaphragm 136 is positioned within the lower chamber 114 and is responsive to water pressure therein to move between a biased position and a relaxed position. In the illustrated embodiment of FIGS. 3-5, the diaphragm 136 is substantially planar in its relaxed position. The push rod 134 is sized such that the ball member 126 is moved away from the valve seat 125 of the opening 124 when the diaphragm 136 is in its relaxed position.

Desirably, the diaphragm 136 separates the lower chamber 114 from an ambient chamber 250. The ambient chamber 250 includes a vent 252 that permits water 20 within the tank 16 to enter the ambient chamber 250. The water within the ambient chamber 250, when no water is supplied to the lower chamber 114, assists the diaphragm 136 in moving to its relaxed position. When water is supplied to the lower chamber 114, a central portion of the diaphragm 136 is flexed downwardly to displace water from the ambient chamber 250 and lower the push rod 134 to permit the ball member 126 to seat on the valve seat 125 of the opening 124.

Although such an arrangement is preferred, alternative arrangements are possible. For example, the ambient chamber 250 may be omitted and the diaphragm 136 may be configured to be normally convex such that its central portion bows upwardly to move the push rod 134 in an upward direction to displace the ball member 126 from the valve seat 125 of the opening 124 in a relaxed position of the diaphragm 136, as shown in the arrangement of FIG. 2. Other arrangements are also possible, as will be appreciated by one of skill in the art.

Figure 9:
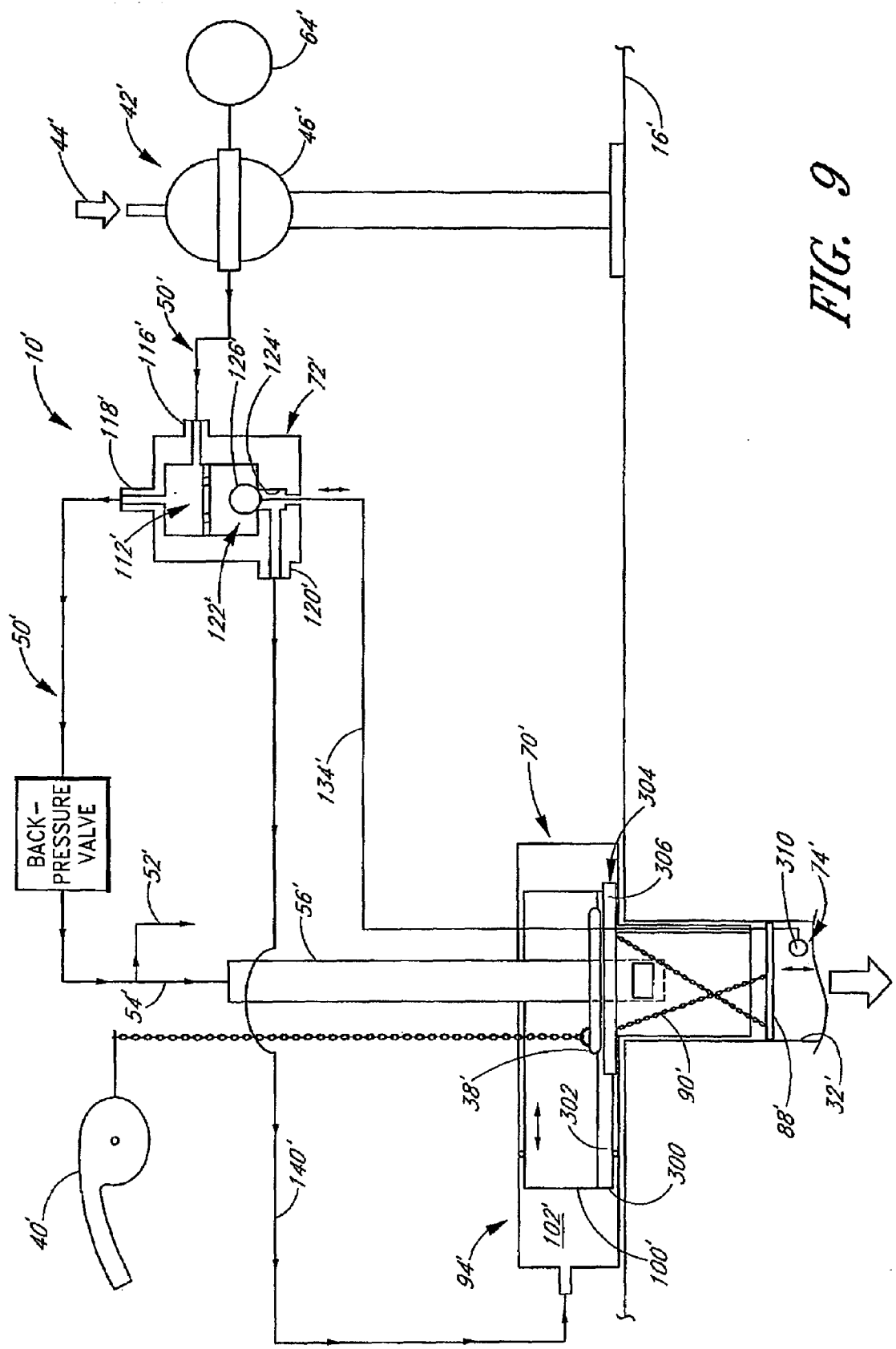
FIG. 9 is a schematic illustration of a modification of the overflow prevention device of FIG. 1, wherein the water level sensor comprises a float. In addition, a transmission mechanism between the fluid cylinder assembly and the overflow valve comprises a rack and pinion arrangement.
Figure 10:
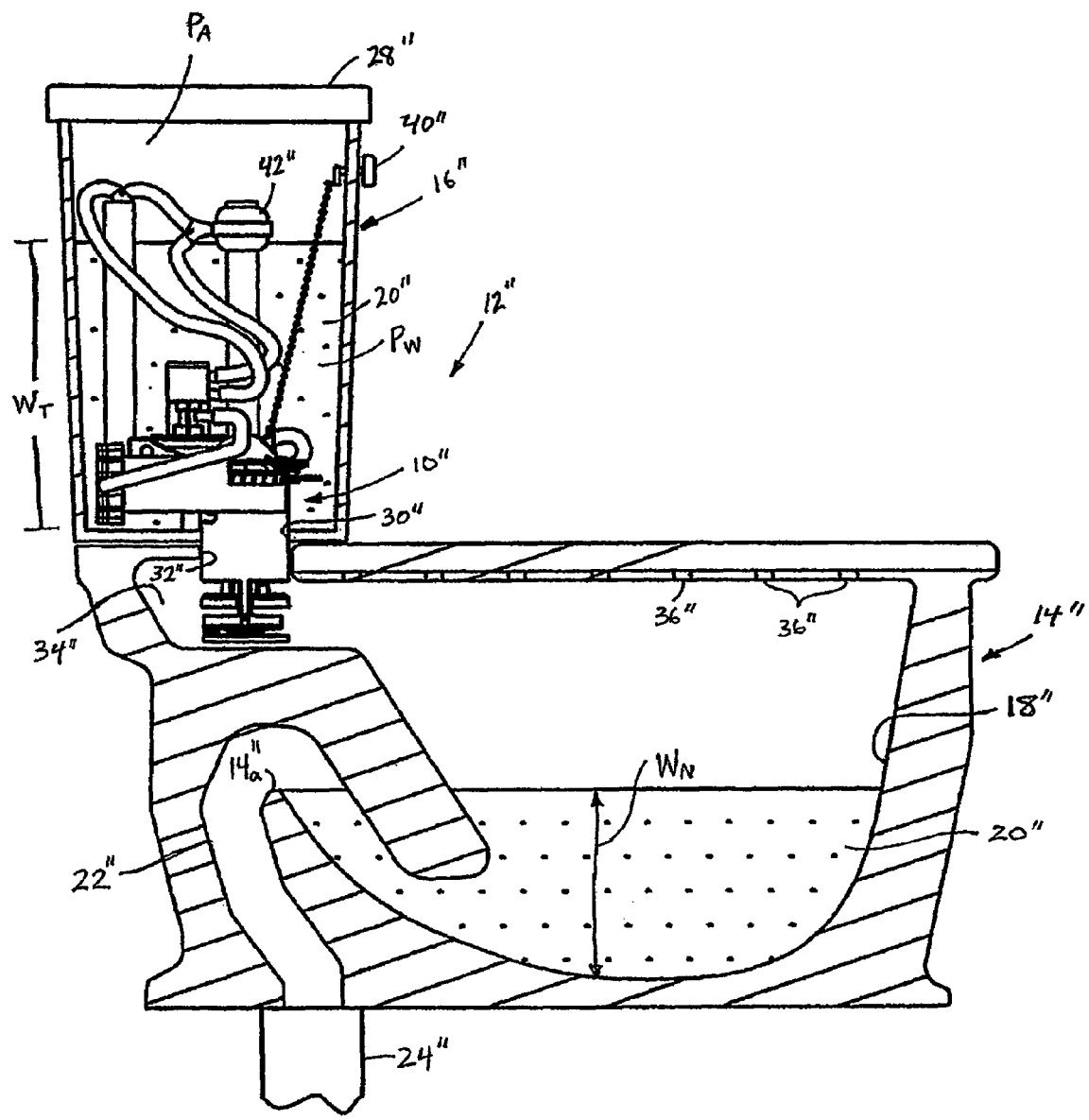
FIG. 10 is a side, partial cross-sectional view of a toilet incorporating an overflow prevention system having certain features, aspects and advantages of a preferred embodiment of the present invention.

FIG. 9 is a schematic illustration of a modification of the overflow prevention device 10 of FIGS. 1-8 and is referred to generally by the reference numeral 10'. The device 10' is substantially similar to the device 10 and, therefore, like reference numerals will be used to denote like components, except that a prime (') has been added. Preferably, the device 10' of FIG. 9 is substantially similar to the device 10 of FIGS. 1-8 with the exception of the overflow valve assembly 70' and the control valve 72'.

In the overflow valve assembly 70' of FIG. 9, the piston 100' is coupled for linear movement with a rack 300, which includes a plurality of gear teeth 302. An outer peripheral edge of the cup 82' defines a pinion gear 304 including a plurality of gear teeth 306. The gear teeth 306 of the pinion gear 304 are configured to engage the gear teeth 302 of the rack 300. Thus, linear motion of the piston 100' is converted to rotational motion of the cup 82' the rack 300 and pinion 304 mechanism, which functions as a transmission mechanism.

Furthermore, the water level sensor 74' of FIG. 9 comprises a float 310, preferably positioned within the passage 32' between the tank 16' and the bowl 18'. The push rod 134' is coupled to the float 310 such that when the float is raised by an above-normal water level the ball member 126' is displaced from the valve seat of the opening 124' and the piston 100' is actuated. Preferably, in all other respects, the device 10' of FIG. 9 operates in a substantially similar manner to the device 10 of FIGS. 1-8.

FIGS. 10-18 illustrate a modification of the toilet overflow prevention device, system 10, of FIGS. 1-8 incorporated within a toilet 12". The toilet overflow prevention system of FIGS. 10-18 is similar to the toilet overflow prevention device 10 of FIGS. 1-8 and, therefore, like reference numerals are used to denote like components, except that a double prime (") is added. Components of the system 10" not described in detail hereafter may be assumed to be the same or similar to the corresponding components described above in relation to the device of FIGS. 1-8 or the device of FIG. 9.

Figure 11:
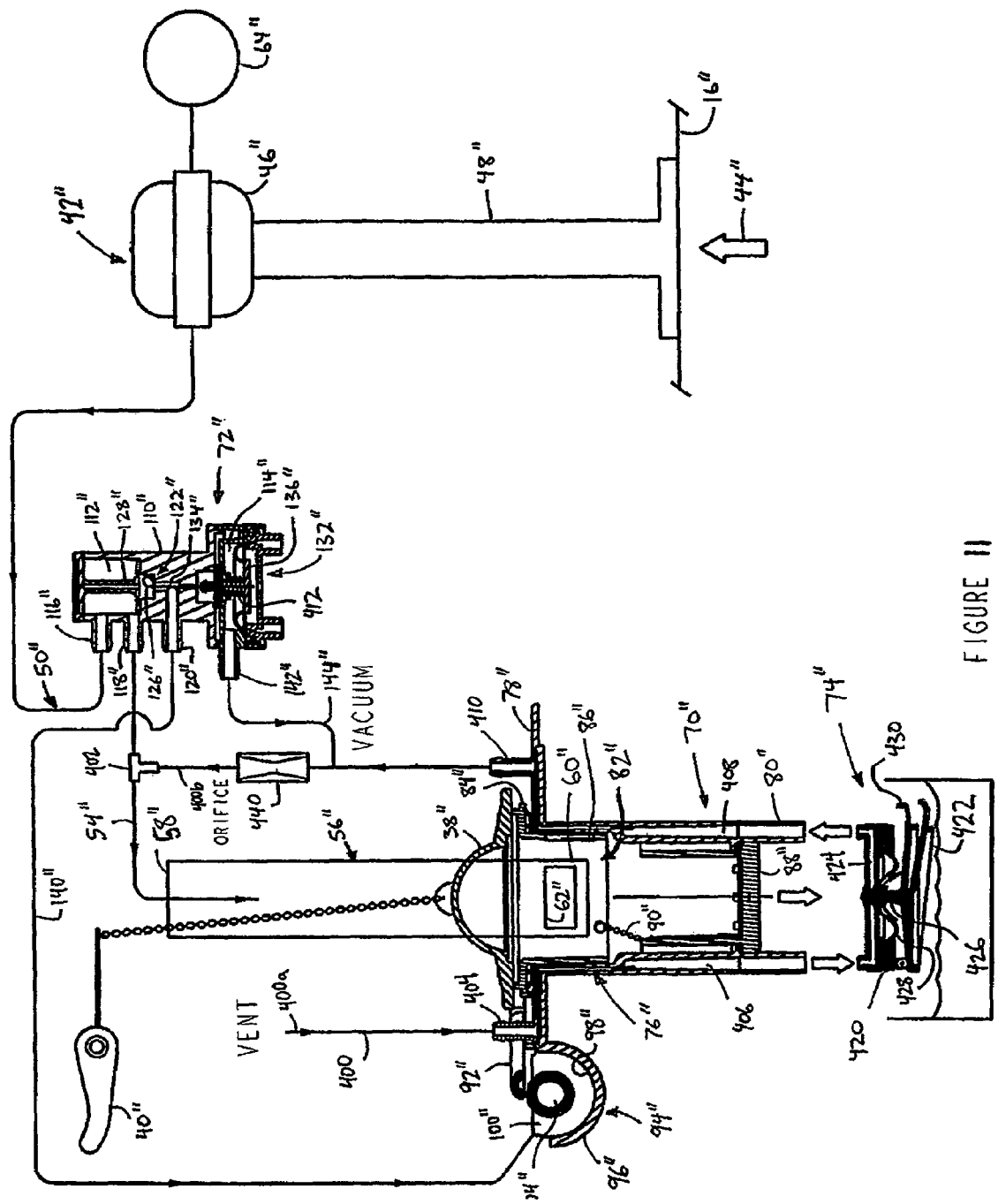
FIG. 11 is a schematic illustration of the toilet and the overflow prevention system of FIG. 10. The illustrated overflow prevention system generally includes an overflow valve assembly, a control valve and a water level sensor.
Figure 12:
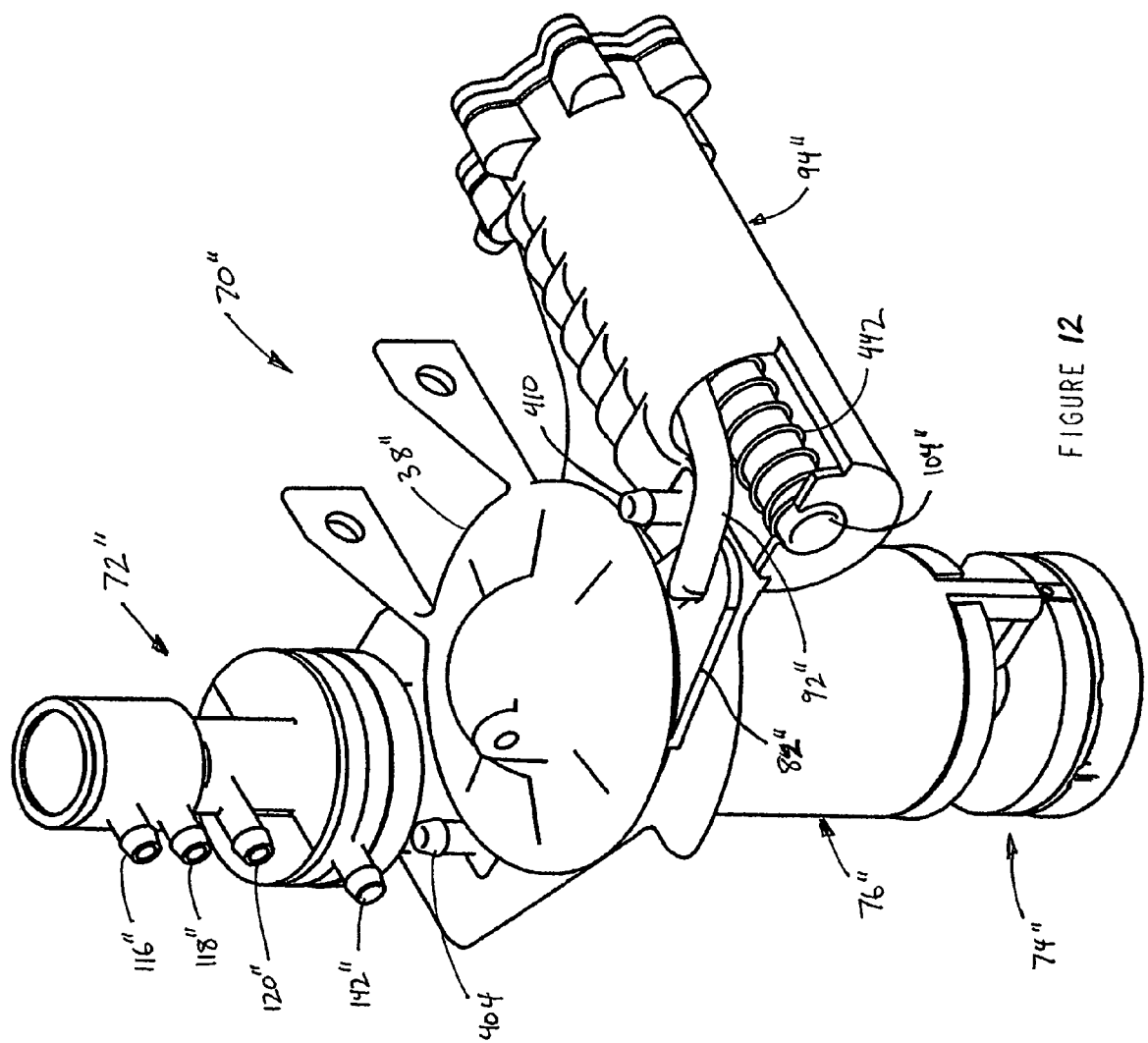
FIG. 12 is a perspective view of the overflow valve assembly and control valve of the overflow prevention system of FIG. 10.
Figure 13:
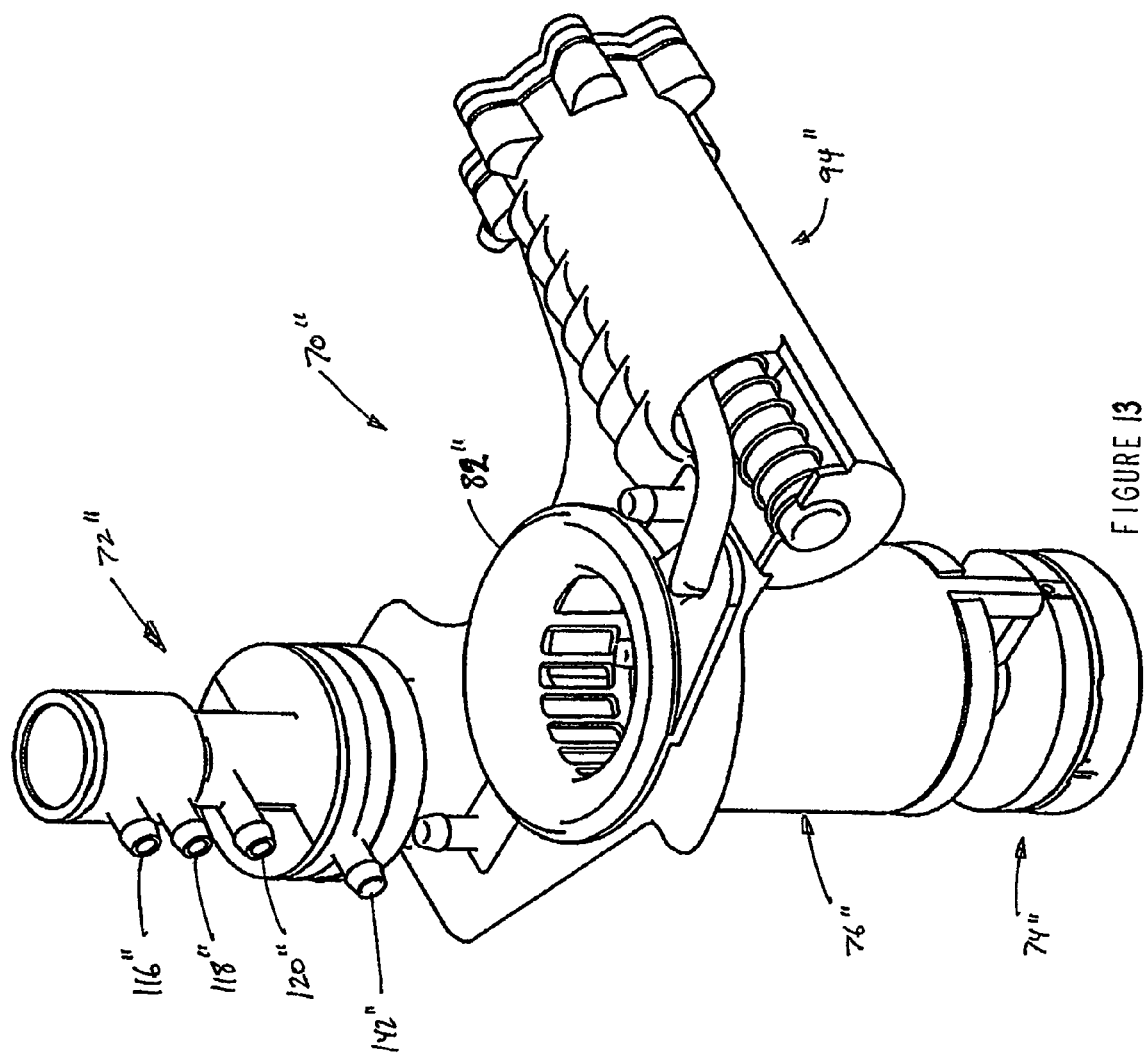
FIG. 13 is the overflow valve assembly and control valve of FIG. 12, with the flapper valve removed.
Figure 14:
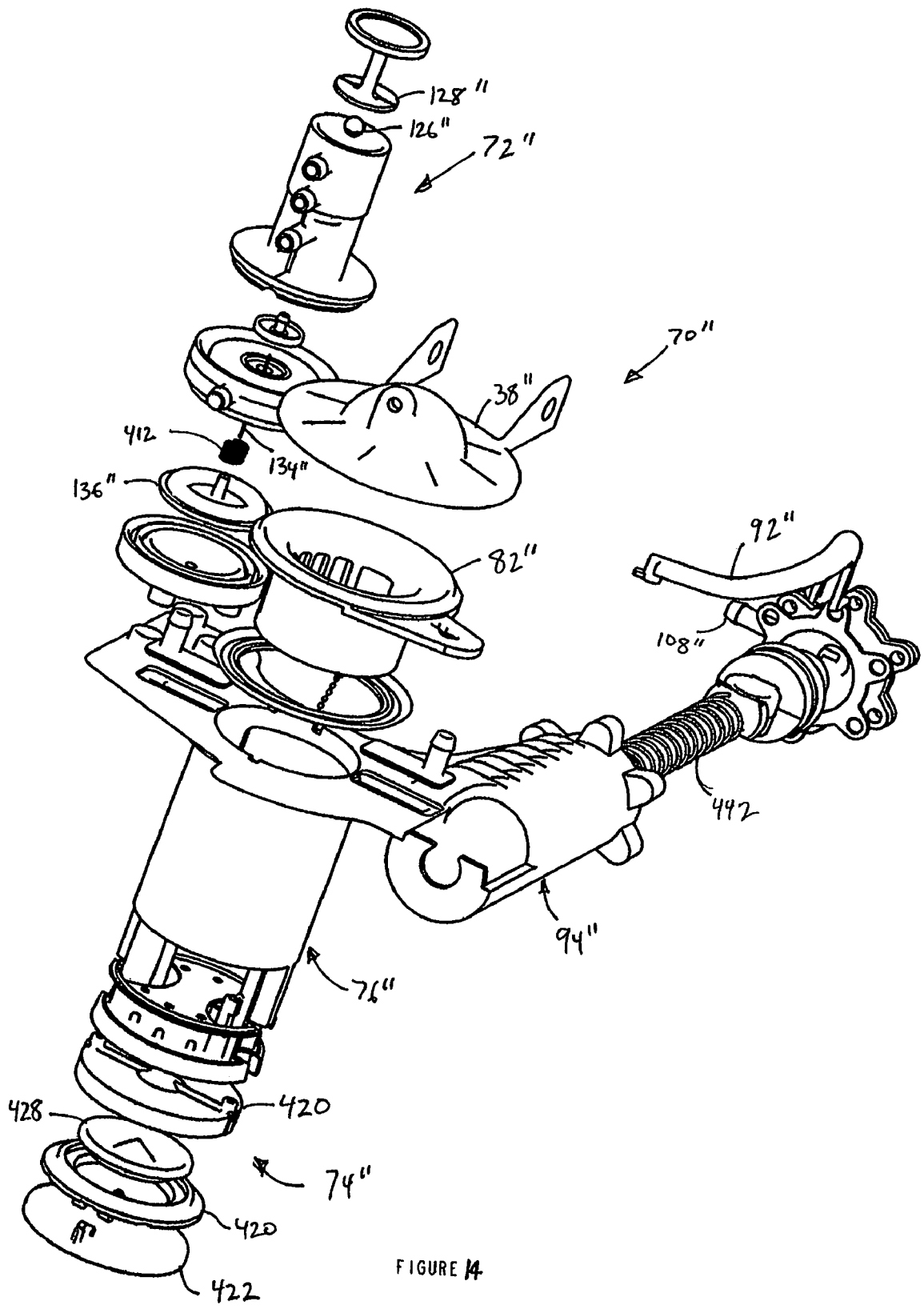
FIG. 14 is an exploded view of the overflow valve assembly and control valve of FIG. 12.
Figure 15:
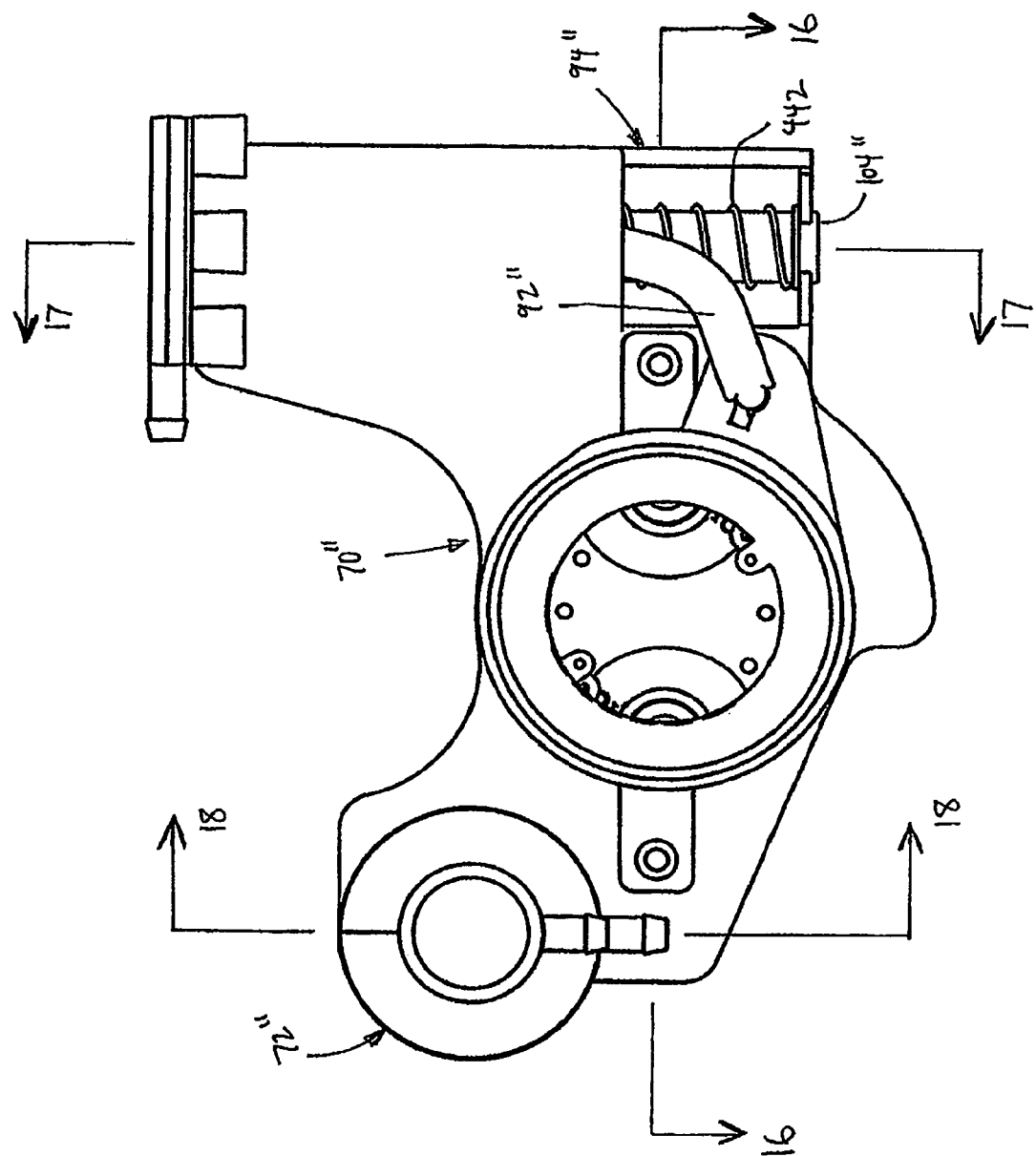
FIG. 15 is a top, plan view of the overflow valve assembly and control valve of FIG. 12.
Figure 16:
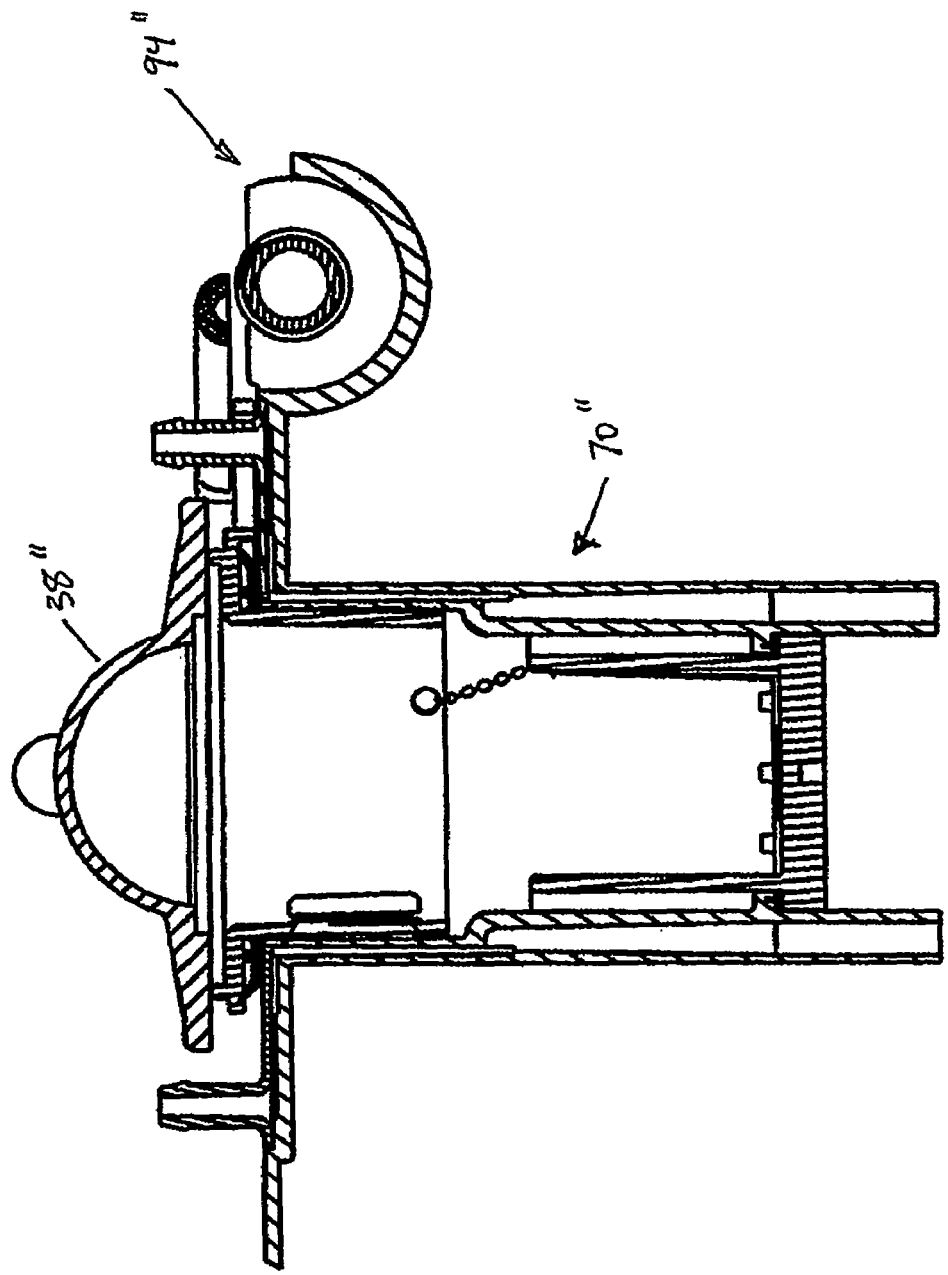
FIG. 16 is a partial cross-sectional view of the overflow valve assembly and control valve of FIG. 12, taken along the view line 16-16 of FIG. 15.
Figure 17:
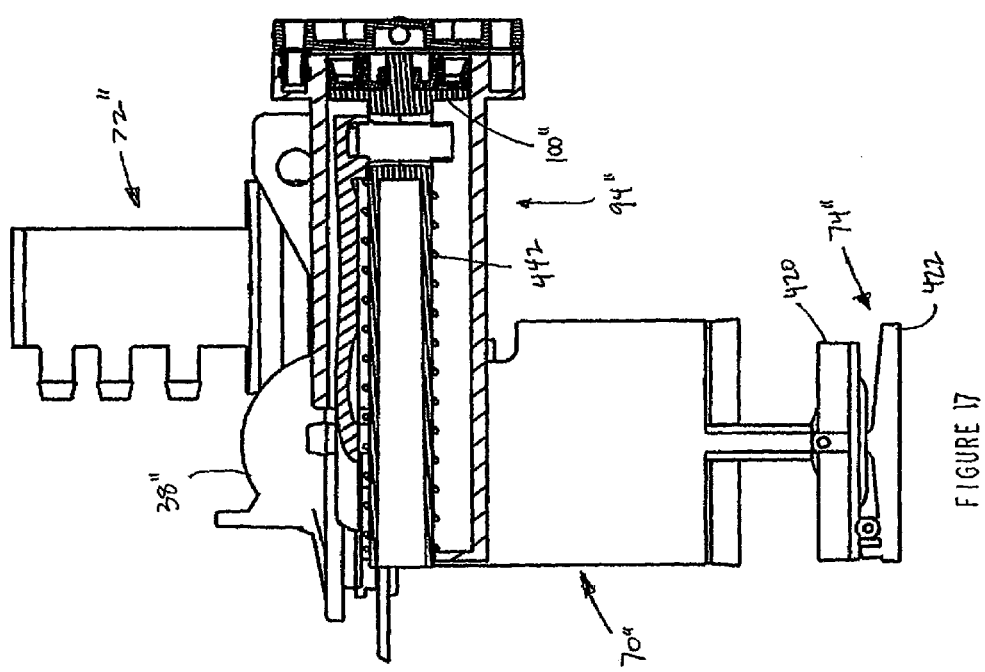
FIG. 17 is a partial cross-sectional view of a fluid cylinder assembly of the control valve shown in FIG. 12, taken along the view line 17-17 of FIG. 15.
Figure 18:
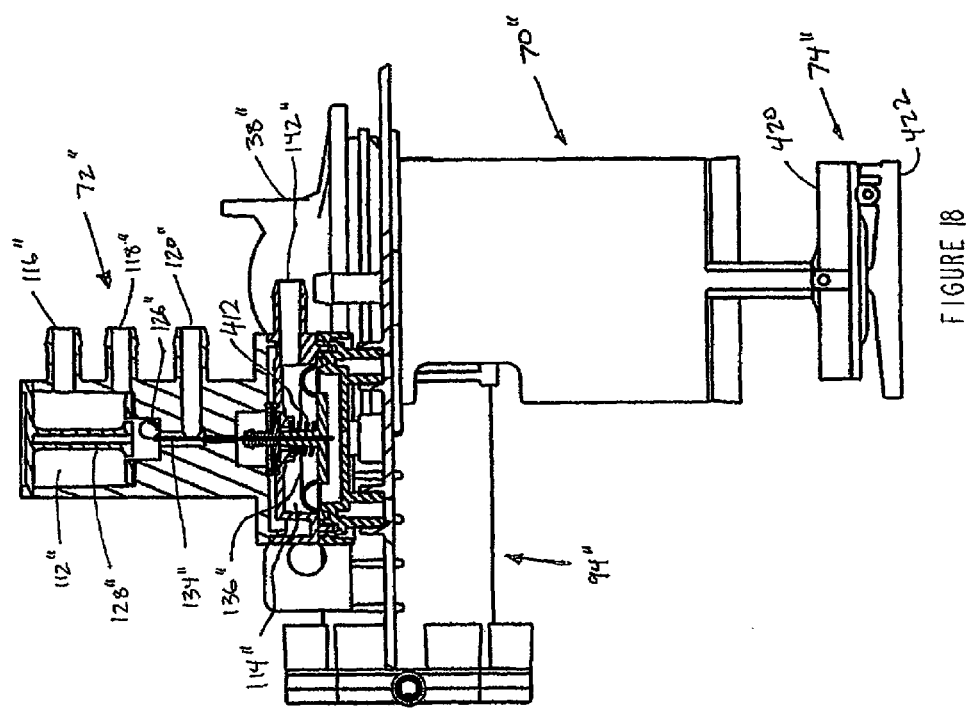
FIG. 18 is a partial cross-sectional view of the control valve of FIG. 12, taken along view line 18-18 of FIG. 15.

The overflow prevention device, system 10", is configured to detect an above-normal water level within the bowl 18" of the toilet 12" and substantially inhibit or prevent a flow of water from the tank 16" to the bowl 18" in response to the above-normal water level condition. With reference to FIG. 11, the overflow prevention system 10" generally includes an overflow valve assembly 70", a control valve 72" and a water level sensor 74". The overflow valve assembly 70" is configured to selectively permit water 20" to flow from the tank 16" to the bowl 18" through the control valve 72" regardless of the position of the flapper valve 38". The control valve 72" preferably functions as an actuator to move the overflow valve assembly 70" between the open position and the closed position. The control valve 72" is configured to receive a control signal from the water level sensor 74" and to send a control signal to the overflow valve assembly 70" to move the overflow valve assembly 70" between the open and closed position. The water level sensor 74" is configured to sense an above-normal water level within the bowl 18" and, in response, send a signal to the control valve 72".

The overflow valve assembly 70" preferably is substantially similar to the overflow valve 70 of FIGS. 1-8. The overflow valve assembly 70" includes a cup 82" supported on a base 76". The cup 82" is rotatable relative to the base 76" to move a stopper 88" between an open and a closed position to selectively permit or inhibit water flow between the tank 16" and the bowl 18" of the toilet 12", respectively. A fluid cylinder 94" is configured to selectively rotate the cup 82". The system 10" is configured to selectively direct a supply of water from the water source 44" of the toilet 12" to the fluid cylinder 94". In response to receiving a supply of water, a piston 100" and piston rod 104" of the fluid cylinder 94" are configured for linear movement. An actuating arm 92" transforms the linear movement of the piston rod 104" into rotational movement of the cup 82", substantially as described above in connection with the fluid cylinder 94 of FIGS. 1-8.

The overflow prevention system 10" preferably includes a fluid passage 400, also referred to herein as a vacuum passage. Desirably, the overflow valve 70" defines a portion of the vacuum passage 400. A first end 400a of the vacuum passage 400 preferably is vented to the atmosphere and, more preferably, within the air portion $P_A$ of the tank 16". A second end 400b of the vacuum passage 400 preferably communicates with the supply line 50" and, in the illustrated arrangement, with the bowl supply branch 54" of the supply line 50" at a connection 402.

Between the first end 400a and the second end 400b, the vacuum passage 400 enters a first port 404 of the overflow valve 70" and travels from an upper portion 78" to a lower portion 80" of the base 76" through a passage portion 406. The vacuum passage 400 continues through the water level sensor 74" and then extends from the lower portion 80" to the upper portion 78" of the base 76" through a passage portion 408 and out a second port 410 of the overflow valve assembly 70". Preferably, the portions 406, 408 of the vacuum passage 400 are defined by the base 76" of the overflow valve assembly. However, in an alternative arrangement the portions 406, 408 may be defined wholly or partially by members that are separate from the overflow valve assembly 70".

The control valve 72" preferably is substantially similar to the control valve 72 of FIGS. 1-8. Desirably, the control valve 72" includes an upper chamber 112" and a separate lower chamber, or control chamber 114". An inlet 116" and a pair of outlets 118", 120" communicate with the upper chamber 112". A valve 122" selectively permits fluid communication between the upper chamber 112" and the outlet 120". Similar to the embodiment described above, the valve 122" preferably includes a valve body, or ball member 126", which selectively permits or substantially prevents fluid flow from the chamber 112" to the outlet 120".

The fluid chamber 112" also includes a baffle 128". In the illustrated arrangement, the baffle 128" is in the form of a stem extending downwardly from an upper wall of the housing 110" of the valve 72". The baffle 128" is configured to inhibit fluid flow within the chamber 112" from influencing a position of the ball member 126".

The inlet 116" communicates with the supply line 50" to receive a supply of water from the water supply source 44". The outlet 118" communicates with the bowl supply passage 54" to supply the bowl 18" with water from the water supply source 44" of the toilet 12". The outlet 120" communicates with a supply line 140" which delivers water from the outlet 120" to the fluid cylinder 94" to actuate the piston 100", preferably as described above.

Similar to the embodiments of FIGS. 1-8 and FIG. 9, the control valve 72" includes a valve actuation mechanism 132". Preferably, the valve actuation mechanism 132" includes a push rod 134" that is movable by a diaphragm 136". Thus, the chamber 114" is a variable volume chamber that is responsive to pressure changes within the chamber 114". The diaphragm 136" moves from a first position at a first pressure within the chamber 114" to a second position at a second pressure within the chamber 114". Preferably, a biasing member such as 412 (FIG. 18) biases the diaphragm 136" toward the first position wherein the push rod 134" is positioned such that the ball member 126" inhibits fluid from passing from the chamber 112" to the outlet 120". When the pressure within the chamber 114" is reduced to a sufficient level, the biasing force of the spring 412 is overcome and the diaphragm 136" moves such that the volume of the chamber 114" is reduced. As a result, the diaphragm 136" moves the push rod 134" to a position to move the ball member 126" away from its valve seat and permit fluid flow from the chamber 112" to the outlet 120".

Preferably, a port 142" permits communication between the lower chamber 114" and a control line 144". The control line 144" is connected to the vacuum passage 400. Thus, changes in pressure within the vacuum line 400 preferably results in a similar change in pressure within the chamber 114".

As described above, the water level sensor 74" is configured to sense an above-normal water level within the bowl 18" of the toilet 12". The water level sensor 74" of FIGS. 10-18 preferably is configured to be positioned within a bowl 18" of the toilet 12" and, in the illustrated arrangement, within the gallery 34". Preferably, the water level sensor 74" is positioned below and, desirably, attached to the overflow valve assembly 70". The water level sensor 74" may also be referred to as a "foot valve" herein due to its position below the overflow valve 70".

The illustrated water level sensor 74" includes a base 420 and a movable portion, or float 422. The movable portion or float 422 preferably has an average density that is less than the density of water, making the movable portion 422 buoyant in water. The movable portion 422 is movable relative to the base 420. In the illustrated arrangement, the movable portion 422 is pivotably coupled to the base 420.

The base 420 preferably defines a portion 424 of the vacuum passage 400 between the portion 406 and the portion 408 of the overflow valve assembly 70". The movable portion 422 includes a post 426 that extends upwardly from the movable portion 422. A diaphragm 428 is interposed between the post 426 and the base 420. Preferably, the diaphragm 428 is secured to the base 420. The movable portion 422 is movable between a first position, or lowered position, to a second, or upward position, wherein the post 426 moves the diaphragm 428 into a position to block the portion 424 of the vacuum passage 400. Accordingly, when the movable portion 422 is in its upward, or closed position, airflow through the vacuum passage 400 is substantially inhibited or prevented.

Preferably, the movable portion 422 is normally in its lower position due to the force of gravity acting to rotate the movable portion 422 downward about its axis of rotation. However, a biasing arrangement may be provided to normally bias the movable portion 422 into its lower position, wherein airflow through the vacuum passage 400 is permitted. Preferably, the movable portion 422 is configured to be buoyant in water, as described above, such that the movable portion 422 moves into its upward position in response to a water level generally equal to a height of the water level sensor 74" or, more specifically, a height of the movable portion 422 in its upward position. However, in another arrangement, a separate buoyant member may be provided which acts directly or indirectly on the movable portion 422. Furthermore, other constructions configured to selectively block air flow through the vacuum passage 400 may also be used.

Desirably, the movable portion 422 preferably includes a lip 430 that extends beyond an outer diameter of the lower portion 80" of the overflow valve assembly 70". Thus, water passing from the tank 16" to the bowl 18" contacts the lip 430 to bias the movable portion 422 toward its lowered position. Advantageously, such an arrangement inhibits undesired upward movement of the movable portion 422 due to transient water beneath and around the movable portion 422 within the gallery 34". Accordingly, undesirable activation of the overflow valve 70" when no above-normal water level condition is present is avoided.

Preferably, the toilet overflow prevention system 10" include a restrictive orifice 440 within the vacuum passage 400. In the illustrated arrangement, the restrictive orifice 440 is positioned between the connection 402 between the second and 400b of the vacuum passage 400 and the bowl supply branch 54" and the connection between the control passage 144" and the vacuum passage 400. However, alternative placements of the restrictive orifice 440 may also be used. Desirably, the restrictive orifice 440 is configured to limit or control a flow rate of air through the vacuum passage 400. Thus, when air is being drawn through the vacuum passage 400, the restrictive orifice 400 controls a flow rate to control a pressure within the chamber 114" of the control valve 72". If desired, the restrictive orifice 440 may be configured to be adjustable.

In operation, the system 10" preferably performs substantially similar to the system 10 of FIGS. 1-8 and the system 10" of the FIG. 9. During a normal flush cycle, when the water level within the bowl 18" does not rise above a normal level, water from the water supply source 44" passes through the chamber 112" of the control valve 72" and into the bowl 18" through the bowl supply branch 54" and, preferably, also to the tank 16" through a tank supply branch (not shown). Movement of the water past the connection 402 between the bowl supply branch 54" and the second end 400b of the vacuum passage 400 draws air from the atmosphere (air portion $P_A$ of the tank 16") through the first end 400a of the vacuum passage 400. The flow of air through the vacuum passage 400 is permitted because the movable portion 422 of the water level sensor 74" is in its lowered position. The restrictive orifice 440 limits a flow rate of air through the vacuum passage 400. As a result, the pressure within the control chamber 114" of the control valve 72" is not reduced to a sufficient level to overcome the biasing force of the spring 412. Thus, the diaphragm 136" remains in its lowered position and the ball member 126" inhibits fluid from moving from the upper chamber 112" to the outlet 120" and to the fluid cylinder 94". Accordingly, the overflow valve assembly 70" remains in an open position and water flow from the tank 16" to the blow 18" is permitted.

If the water level within the bowl 18" rises to a sufficient level to move the float 422 or movable portion of the water level sensor 74" to its upward position, the flow of air through the vacuum passage 400 is substantially reduced or prevented. As a result, the pressure within the control chamber 114" is reduced to a sufficient level to overcome the biasing force of the spring 412 due to the venturi effect of the water within the bowl supply line 54" passing the second end of the 400b of the vacuum passage 400. Thus, the push rod 134" moves the ball member 126" to a position such that fluid communication is permitted between the chamber 112" and the outlet 120" of the control valve 72". A supply of water is thus provided to the fluid cylinder 94" to activate the fluid cylinder 94" and move the overflow valve assembly 70" to its closed position, as described above. Thus, water flow from the tank 16" to the bowl 18" is substantially inhibited or prevented. Accordingly, overflow of the toilet bowl 18" is prevented.

Preferably, the fluid cylinder 94" includes a biasing element, such as spring 442, to bias the piston 100" to its normal position once a supply of water is no longer directed to the fluid cylinder 94" by the control valve 72", thereby resetting the system 10" for further use. Movement of the piston 100" back toward its normal position may force water back through passage 140" and through the valve 122". Desirably, the pressure exerted on the water within the fluid cylinder 94" due to the force of the spring 442 provides a sufficient force to move the ball member 126" from its valve seat and permit a substantial portion of the water to exit the fluid cylinder 94". The water may then move from the upper chamber 112" of the control valve 72" to the bowl 18" through the bowl supply line 54".

In an alternative arrangement of the system 10", the water level sensor 74" is configured to be normally closed. That is, the water level sensor 74" is configured to substantially or completely block the vacuum passage 400 in the absence of a force tending to move the water level sensor 74" to an open position, wherein the vacuum passage 400 is not blocked. Preferably, in such an arrangement, the movable portion 422 of the water level sensor 74" is biased upwardly toward the base 420 by a biasing member, such as a spring, for example. The movable portion 422 is configured such that water moving from the tank 16" to the bowl 18" through the overflow valve 70" biases the movable portion 422 to an open position during a normal flush cycle, that is, when the water level within the bowl 18" is not above a normal-water level $W_N$. Preferably, the overflow valve 70" and/or water level sensor (foot valve) 74" include surfaces or features shaped to direct a flow of water in a manner to facilitate the flow of water producing a force on the movable portion 422 sufficient to bias the moveable portion 422 to the open position. In such a situation, a significant vacuum within the control chamber 114" is not produced and the overflow valve 70" remains open. As will be appreciated by one of skill in the art, during a normal flush cycle, water from the water supply line 50" may potentially be directed to the fluid cylinder 94" (thus tending to actuate the overflow valve 70") until water from the tank 16" reaches the water level sensor 74" to bias the movable portion 422 to the open position. Preferably, the timing of water reaching the fluid cylinder 94" is correlated with the timing for the water level sensor 74" to be biased to the open position to reduce or eliminate any undesirable actuation of the overflow valve 70" during a normal flush cycle. Such timing correlation may be accomplished by any suitable manner, such as by suitably configuring the length or diameter of any of the systems' 10" fluid passages and/or suitably configuring the size, shape or relative position of the overflow valve 70", control valve 72" or water level sensor 74".

If the water level is above a normal level $W_N$ when a flush cycle is commenced, the water level sensor 74" will be surrounded by water, or will soon be surrounded by water if it is not already, due to a rising water level resulting from the obstruction preventing the bowl 18" from emptying at a normal rate. Preferably, in such a situation, the water level sensor 74" is configured such that water moving from the tank 16" to the bowl 18" through the overflow valve 70" does not bias the movable portion 422 to an open position. Preferably, this is because the water moving from the tank 16" to the bowl 18" through the overflow valve 70" flows into a space filled with water, rather than into an air space as occurs during a normal flush cycle (with a normal water level). As a result, the water entering from the tank 16" does not apply a sufficient force to the moveable portion 422 to bias it into an open position due to the presence of the water surrounding the water level sensor 74". Accordingly, the water level sensor 74" remains in a closed position and a vacuum is created in the vacuum passage 400 due to the venture effect of water in the bowl supply passage 54" passing the second end 400b of the vacuum passage 400 and, as described above, the pressure changes within the control chamber 114" of the control valve 72" to actuate the fluid cylinder 94" of the overflow valve 70". Thus, the overflow valve 70" is moved to a closed position, preferably as described above, to substantially inhibit or prevent additional water from moving from the tank 16" to the bowl 18".

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalence thereof. For example, in some standard flapper valve assemblies, the flapper is arranged in a non-horizontal, or slanted, orientation. The present toilet overflow prevention device may include a wedge-like insert below the flapper to convert such a non-horizontal flapper valve assembly into essentially a horizontal flapper valve assembly. Optionally, the overflow valve assembly of the present device may be modified for use with such non-horizontal flapper valve assemblies, or other types of flapper valve assemblies, as will be appreciated by one of skill in the art.

Furthermore, while the present toilet overflow prevention device has been described in the context of particularly embodiments, the skilled artisan will appreciate, in view of the present disclosure, that certain advantages, features and aspects of the device may be realized in a variety of other applications, many of which have been noted above. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by fair reading of the claims.

What is claimed is:

1. A toilet overflow prevention system, comprising:
   an overflow valve configured to move between an open position in which water flow is permitted between a tank of the toilet and a bowl of the toilet through said overflow valve and a closed position in which said overflow valve substantially prevents water flow from the tank to the bowl, said overflow valve movable between said open position and said closed position in response to a control signal;
   a control valve configured to selectively send a control signal to said overflow valve;
   a water level sensor comprising a base and a movable portion that is movable relative to said base, said water level sensor defining a portion of a fluid passage that communicates with said control valve, wherein said movable portion moves relative to said base in response to an above-normal water level in the bowl to a position such that said movable portion cooperates with said base to substantially block flow through said fluid passage and thereby cause said control valve to send a control signal to said overflow valve, wherein said movable portion comprises a lip configured to interfere with water flow from the tank to the bowl, wherein said water flow applies a force to said lip tending to move said movable portion away from said base.

2. The toilet overflow prevention system of claim 1, wherein said movable portion is configured to be buoyant in water.

3. The toilet overflow prevention system of claim 1, wherein said movable portion is pivotally secured to said base.

4. The toilet overflow prevention system of claim 1, wherein said movable portion comprises a valve body configured to substantially block flow through said fluid passage in response to an above-normal water level in said bowl.

5. The toilet overflow prevention system of claim 4, additionally comprising a diaphragm positioned between said base and said valve body of said movable portion.

6. The toilet overflow prevention system of claim 1, additionally comprising a restriction orifice within said fluid passage sized to limit a flow of fluid through said fluid passage.

7. The toilet overflow prevention system of claim 1, wherein said overflow valve defines a portion of said fluid passage.

8. A toilet overflow prevention system for use with a toilet having a water supply source, comprising:
   an overflow valve configured to move between an open position in which water flow is permitted between a tank of the toilet and a bowl of the toilet through said overflow valve and a closed position in which said overflow valve substantially prevents water flow from the tank to the bowl, said overflow valve movable between said open position and said closed position in response to a control signal;
   a control valve configured to selectively send a control signal to said overflow valve;
   a water level sensor comprising a base and a movable portion that is movable relative to said base, said water level sensor defining a portion of a fluid passage that communicates with said control valve, wherein said movable portion moves relative to said base in response to an above-normal water level in the bowl to a position such that said movable portion cooperates with said base to substantially block flow through said fluid passage and thereby cause said control valve to send a control signal to said overflow valve, wherein said fluid passage includes a first end and a second end, said first end vented to the atmosphere and said second end communicating with a water supply passage connected to said water supply source such that water flowing through said water supply passage past said second end tends to draw atmospheric air through said fluid passage.

9. The toilet overflow prevention system of claim 8, wherein said control valve comprises a variable-volume control chamber in communication with said fluid passage.

10. A toilet overflow prevention system for use with a toilet, comprising:
    an overflow valve configured to substantially prevent water flow from a tank of the toilet to a bowl of the toilet through said overflow valve when said overflow valve is in a closed position, said overflow valve comprising a fluid chamber and being configured to move to said closed position in response to a supply of water directed to said fluid chamber;
    a control valve configured to selectively direct a supply of water to said overflow valve, said control valve having a fluid inlet, a first fluid outlet and a valve body, said inlet receiving a supply of water from a water supply source of the toilet, said outlet configured to direct a portion of said supply of water to said overflow valve, said valve body movable between a first position in which fluid communication between said inlet and said first outlet is substantially prevented and a second position in which fluid communication between said inlet and said first outlet is permitted;
    a variable-volume control chamber configured to act on said valve body, wherein at a first volume of said control chamber said valve body is in said first position and at a second volume of said control chamber said valve body is moved to said second position;

a water level sensor configured to sense an above-normal water level in the bowl and communicate with said control chamber, wherein said water level sensor is configured to change a pressure within said control chamber to move said control chamber from said first volume to said second volume; and a fluid passage having a first end and a second end, said first end vented to the atmosphere and said second end communicating with a water supply passage connected to the water supply source such that water flowing through said water supply passage past said second end tends to draw atmospheric air through said fluid passage, said water level sensor configured to selectively substantially block a flow of air through said fluid passage.

11. The toilet overflow prevention system of claim 10, wherein said control chamber is in communication with said fluid passage.

12. The toilet overflow prevention system of claim 10, additionally comprising a flow restricting orifice within said fluid passage.

13. The toilet overflow prevention system of claim 10, wherein said overflow valve defines a portion of said fluid passage.

14. The toilet overflow prevention system of claim 10, additionally comprising a diaphragm defining a portion of said control chamber.

15. The toilet overflow prevention system of claim 14, wherein said diaphragm carries a push rod, said push rod configured to move said valve body between said first and second positions.

16. The toilet overflow prevention system of claim 10, said control valve additionally comprising a second fluid outlet in communication with said fluid inlet when said valve body is in either of said first position and said second position.

* * * * *